(12) United States Patent  
Terai

(10) Patent No.: US 9,175,961 B2  
(45) Date of Patent: Nov. 3, 2015

(54) INFORMATION PROCESSING APPARATUS, INFORMATION PROCESSING METHOD, PROGRAM, AND RECORDING MEDIUM

(75) Inventor: Takao Terai, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 98 days.

(21) Appl. No.: 13/810,333

(22) PCT Filed: Jun. 17, 2011

(86) PCT No.: PCT/JP2011/063928  
§ 371 (c)(1),  
(2), (4) Date: Jan. 15, 2013

(87) PCT Pub. No.: WO2012/011345  
PCT Pub. Date: Jan. 26, 2012

(65) Prior Publication Data  
US 2013/0116923 A1 May 9, 2013

(30) Foreign Application Priority Data

Jul. 22, 2010 (JP) ................................ 2010-165021

(51) Int. Cl.

| | | |
|---|---|---|
| *G01C 21/20* | (2006.01) | |
| *G01C 21/00* | (2006.01) | |
| *G01C 21/36* | (2006.01) | |
| *G08G 1/123* | (2006.01) | |
| *G06F 17/30* | (2006.01) | |

(52) U.S. Cl.  
CPC ................ *G01C 21/00* (2013.01); *G01C 21/20* (2013.01); *G06F 17/30241* (2013.01)

(58) Field of Classification Search  
CPC ...... G01C 7/00; G01C 21/36; G01C 21/3697; G01C 21/20; G01C 21/00; G06F 17/30241; H04N 5/9201; G11B 2220/2545; G11B 2220/213; G08G 1/0962; G08G 1/123  
USPC ........................ 701/440; 709/219; 455/456.1  
See application file for complete search history.

(56) References Cited

U.S. PATENT DOCUMENTS

| | | | | |
|---|---|---|---|---|
| 6,906,643 | B2 * | 6/2005 | Samadani et al. | 340/995.18 |
| 7,149,961 | B2 * | 12/2006 | Harville et al. | 715/202 |
| 7,188,156 | B2 * | 3/2007 | Bertram et al. | 709/219 |

(Continued)

FOREIGN PATENT DOCUMENTS

| | | |
|---|---|---|
| JP | 2003-65784 A | 3/2003 |
| JP | 2003-187523 A | 7/2003 |

(Continued)

OTHER PUBLICATIONS

U.S. Appl. No. 13/809,952, filed Jan. 14, 2013, Terai.

(Continued)

*Primary Examiner* — John Q Nguyen  
*Assistant Examiner* — Aaron Smith  
(74) *Attorney, Agent, or Firm* — Oblon, McClelland, Maier & Neustadt, L.L.P.

(57) ABSTRACT

There is provided an information processing apparatus including, a track list generation unit that generates a track list that is a list of track groups including at least a movement trajectory track generated from movement trajectory information containing position information and time information corresponding to the position information, and a display control unit that causes a display device to display a list screen including the track list.

16 Claims, 32 Drawing Sheets

(56) References Cited

U.S. PATENT DOCUMENTS

| | | | |
|---|---|---|---|
| 7,627,420 B2 * | 12/2009 | Ujino | 701/440 |
| 8,583,139 B2 * | 11/2013 | Jung et al. | 455/456.1 |
| 2003/0046002 A1 | 3/2003 | Miwa | |
| 2004/0167715 A1 | 8/2004 | Miwa | |
| 2006/0224311 A1 * | 10/2006 | Watanabe et al. | 701/208 |
| 2008/0048890 A1 * | 2/2008 | Sheha et al. | 340/995.1 |
| 2009/0183075 A1 | 7/2009 | Kang et al. | |
| 2011/0160996 A1 | 6/2011 | Terai et al. | |

FOREIGN PATENT DOCUMENTS

| | | |
|---|---|---|
| JP | 2005-4891 A | 1/2005 |
| JP | 2007-51884 A | 3/2007 |
| JP | 2008-14711 A | 1/2008 |
| JP | 2009-169955 A | 7/2009 |
| JP | 2010-79843 A | 4/2010 |

OTHER PUBLICATIONS

U.S. Appl. No. 13/704,821, filed Dec. 17, 2012, Terai.

International Search Report Issued Sep. 20, 2011 in PCT/JP2011/063928.

Combined Office Action and Search Report issued Dec. 22, 2014 in Chinese Patent Application No. 201180034747.3 (with English translation).

* cited by examiner

INFORMATION PROCESSING APPARATUS, INFORMATION PROCESSING METHOD, PROGRAM, AND RECORDING MEDIUM

TECHNICAL FIELD

The present disclosure relates to an information processing apparatus, an information processing method, a program, and a recording medium.

BACKGROUND ART

Car navigation devices that show a path to a destination based on position information acquired using the GPS (Global Positioning System) or the like are currently being proliferated. For example, a navigation system that records movement trajectory information and uses the movement trajectory information as reference information for navigational path search has been discussed in Patent Literature 1.

Meanwhile, in recent years, a function of acquiring position information has been mounted on a number of portable electronic devices, such as a mobile phone, a portable game device, a notebook PC (Personal Computer), and a camera. As a result, the position information may be used in various formats.

CITATION LIST

Patent Literature

Patent Literature 1: Japanese Patent Application Laid-Open No. 2010-79843

SUMMARY OF INVENTION

Technical Problem

For example, new use to play back and "view" a movement trajectory by displaying the movement trajectory superimposed on a position on a map and displaying an icon moving along the movement trajectory may be considered. However, the movement trajectory information is typically a set of data, it is difficult to directly treat the movement trajectory information, and the movement trajectory information may be monotonous when played back.

Thus, treating the movement trajectory information in units of tracks by generating a movement trajectory track from movement trajectory information divided based on an analysis result of the movement trajectory information may be considered. In this case, an interface for playing back the movement trajectory track has not been considered.

Thus, the present disclosure has been made in view of the problem described above, and an object of the present disclosure is to provide an information processing apparatus, an information processing method, and a program that are novel and improved and capable of providing a list screen of a track group including a movement trajectory track.

Solution to Problem

According to an embodiment of the present disclosure, there is provided an information processing apparatus including a track list generation unit that generates a track list that is a list of track groups including at least a movement trajectory track generated from movement trajectory information containing position information and time information corresponding to the position information; and a display control unit that causes a display device to display a list screen including the track list.

According to such a configuration, it is possible to provide a list screen of a track group including a movement trajectory track generated from movement trajectory information divided based on the analysis result of the movement trajectory information.

Further, the display control unit may cause a process-type list screen to be displayed, in which tracks arranged in time series based on the time information are each represented by a bar having a length according to a playback time or a movement time of each of the tracks.

Further, the process-type list screen may include information of a start time of each track.

Further, the movement trajectory information may be movement history information that is a history of position information, the track group may include a missing track indicating a missing part in acquisition of the position information, and the display control unit may cause a process-type list screen shown in a format for distinguishing the missing track from other tracks to be displayed.

Further, the display control unit may cause a normal list screen in which attribute data of the track group is shown in a table format to be displayed.

Further, the display control unit may perform switching between the normal list screen and the process-type list screen according to switching instruction information for the list screen.

Further, the display control unit further causes a playback screen for a track selected among the tracks displayed in the list screen to be displayed.

Further, the display control unit causes the normal list screen in which the track groups are sorted based on designated attribute data to be displayed.

Further, according to another embodiment of the present disclosure, there is provided an information processing method including generating a track list that is a list of track groups including at least a movement trajectory track generated from movement trajectory information containing position information and time information corresponding to the position information, and causing a display device to display a list screen including the track list.

Further, according to another embodiment of the present disclosure, there is provided a program for causing a computer to execute an information processing method, the information processing method including generating a track list that is a list of track groups including at least a movement trajectory track generated from movement trajectory information containing position information and time information corresponding to the position information, and causing a display device to display a list screen including the track list.

Advantageous Effects of Invention

As described above, according to the present disclosure, it is possible to provide a list screen of a track group including a movement trajectory track.

DESCRIPTION OF EMBODIMENTS

Hereinafter, preferred embodiments of the present disclosure will be described in detail with reference to the appended drawings. Note that, in this specification and the drawings, elements that have substantially the same function and structure are denoted with the same reference signs, and repeated explanation is omitted.

Further, a description is given in the following order.
1. Overview
2. First Embodiment (PND)
2-1. Navigation Function Unit (Generation of Movement Trajectory Information)
2-2. Division of Movement Trajectory Information
2-3. Track Generation
2-4. Track List Generation
2-5. Track Playback
3. Second Embodiment (Playback Device)
4. Third Embodiment (Imaging Device)

1. Overview

Figure 29:
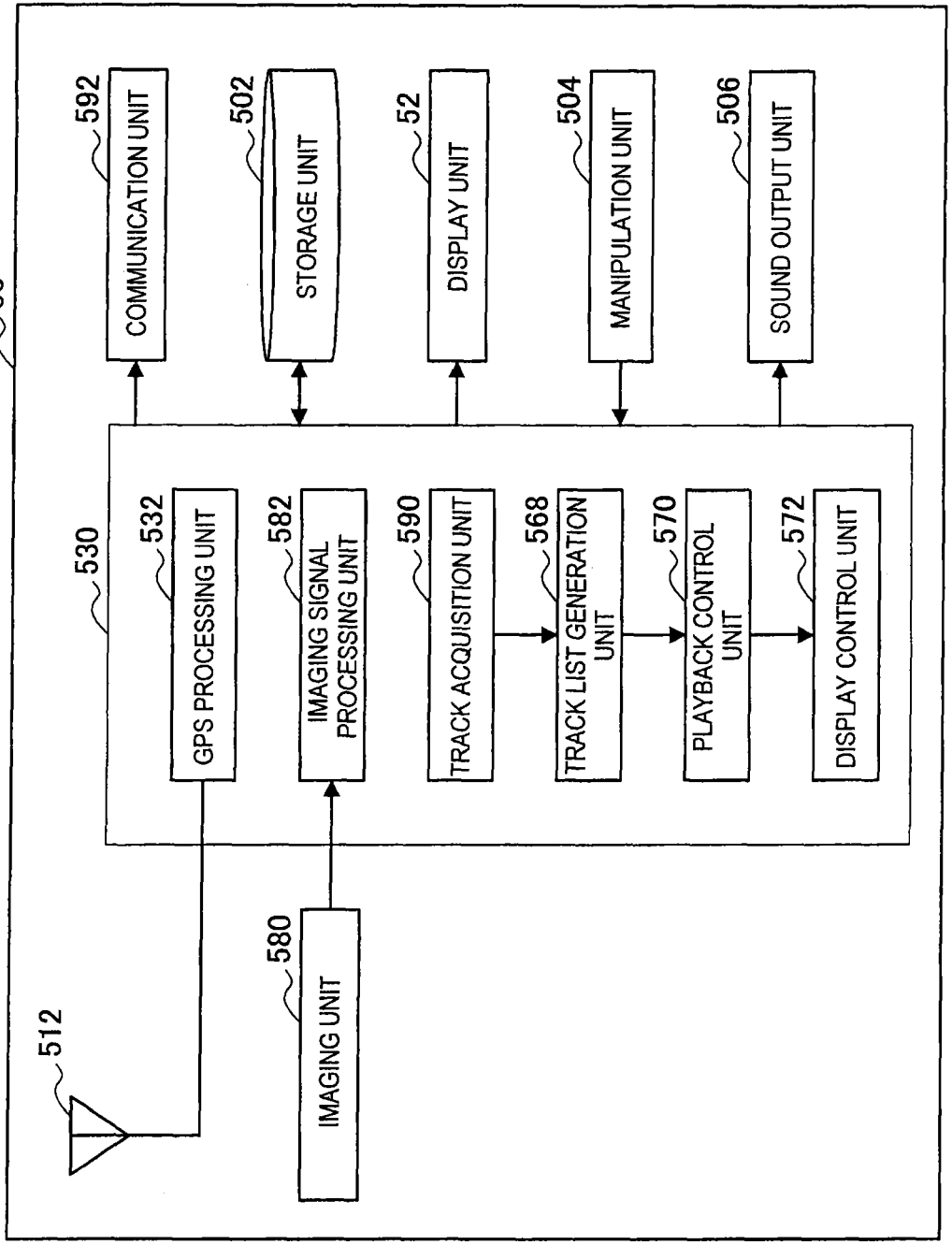
FIG. 29 is a block diagram illustrating a functional configuration of an information processing apparatus (imaging device) according to a third embodiment.
Figure 30:
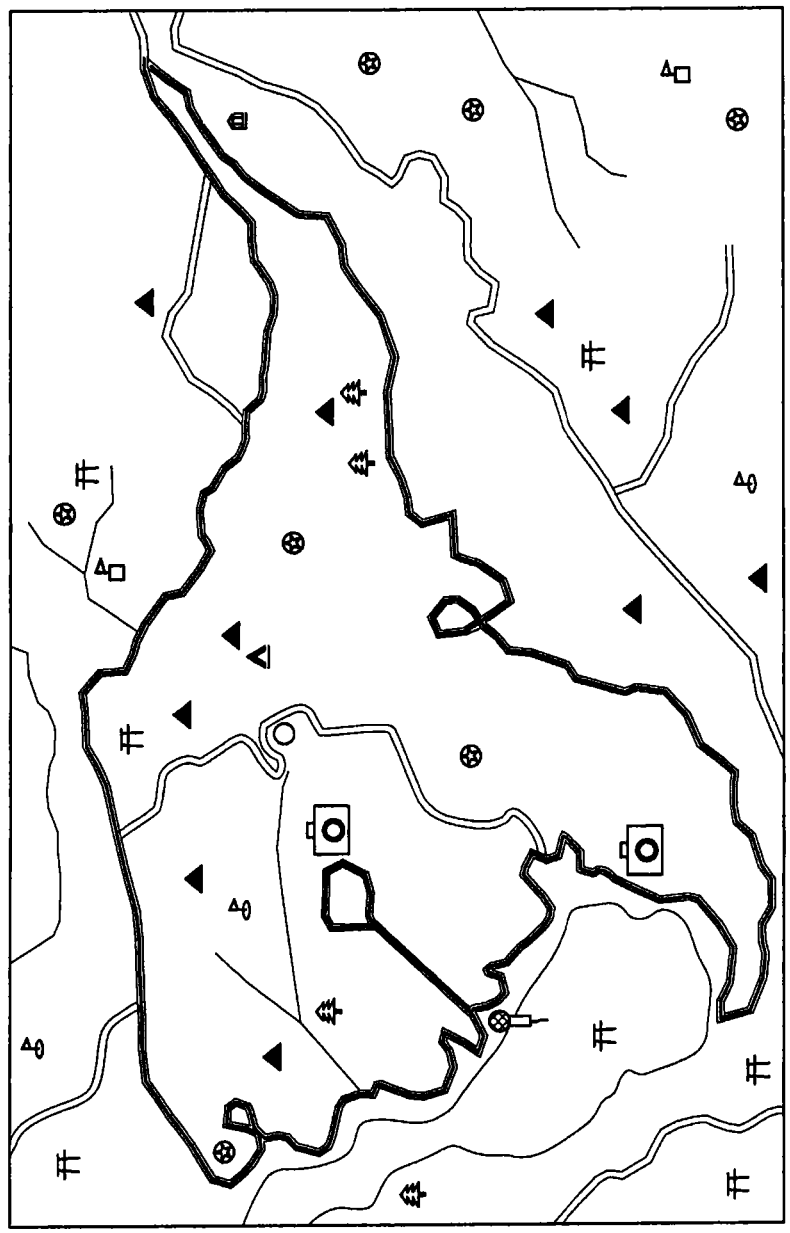
FIG. 30 is an illustrative diagram illustrating an example of a movement trajectory superimposed on a map.
Figure 31:
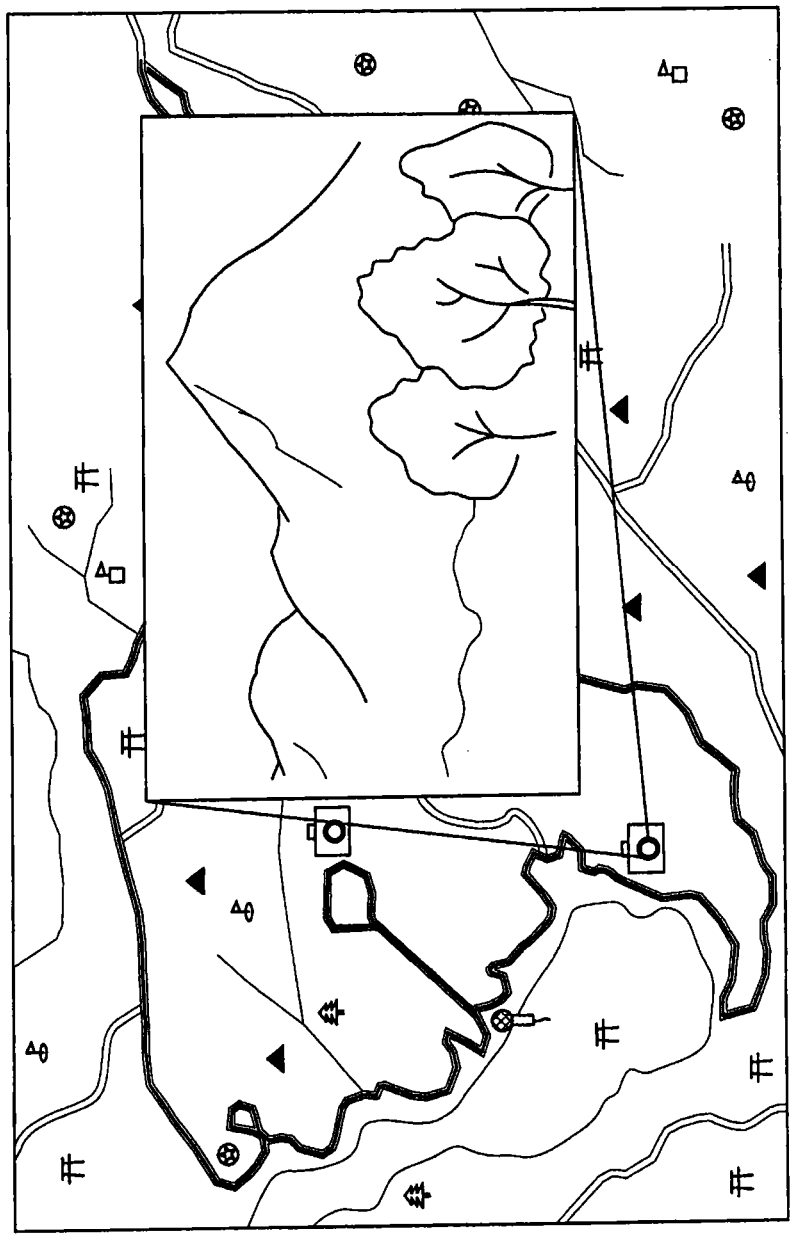
FIG. 31 is an illustrative diagram illustrating an example of playback of photograph data with a link on a map.
Figure 32:
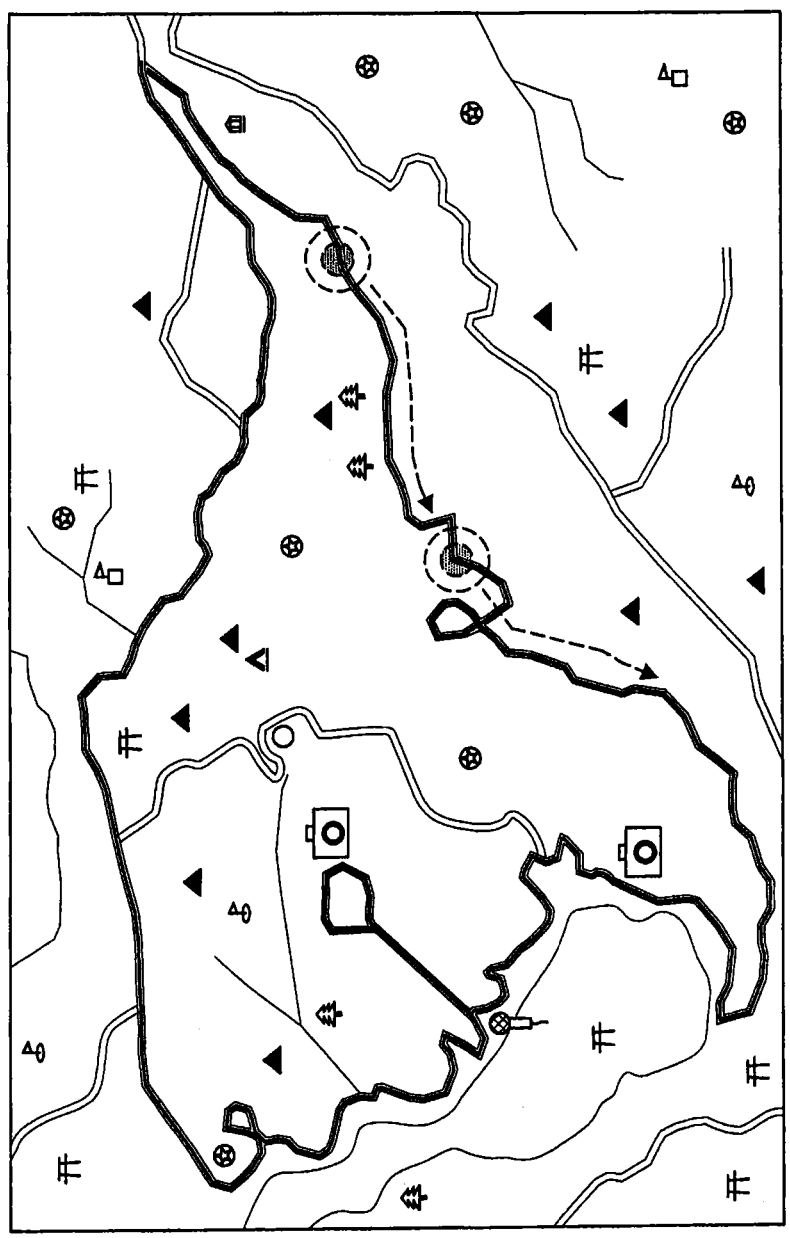
FIG. 32 is an illustrative diagram illustrating an example of playback of a movement trajectory based on a motion of a symbol.

First, an overview of a function provided by an information processing apparatus according to an embodiment of the present disclosure will be described. Here, in order to facilitate understanding of differences between the embodiment and related art, an overview of the related art will first be described with reference to FIGS. 29 to 31. FIG. 30 is an illustrative diagram illustrating an example of a movement trajectory superimposed on a map. Further, FIG. 31 is an illustrative diagram illustrating an example of playback of photograph data with a link on the map. FIG. 32 is an illustrative diagram illustrating an example of playback of a movement trajectory by a motion of a symbol.

Conventionally, devices on which a function of acquiring position information has been mounted and used have been limited, mainly to car navigation devices. However, currently, mounting the function of acquiring position information has become possible on all information processing apparatuses. For example, the position information acquisition function in a mobile phone has become a standard function and is mounted on all portable information processing apparatuses, such as a digital camera, a portable game device, a notebook PC (Personal Computer), and a portable music player device.

Further, a portable navigation device that is easily detached, called a PND (Personal Navigation Device), has been introduced in the field of navigation devices as well. Accordingly, an environment that allows a user to acquire position information even when the user moves by means other than a car, such as walking, public transportation, or a bicycle, is provided. If a history of position information is recorded using such an information processing apparatus, movement trajectory information of a user may be generated.

Such movement trajectory information has been conventionally provided, for example, by superimposing a movement trajectory on a map and displaying the movement trajectory as illustrated in FIG. 30. In this case, when position information of a photography point is contained in photograph data or the like, a camera mark indicating that there is photograph data captured at that point may be shown on the map. For example, this photograph data is displayed by clicking on the camera mark, as illustrated in FIG. 31. Alternatively, a photograph may be displayed on the map.

Further, a state of a movement may be visually represented by moving the symbol along the movement trajectory superimposed on the map as illustrated in FIG. 32.

In an embodiment of the present disclosure, dividing the movement trajectory information and treating the divided movement trajectory information as a track is proposed. Further, content such as a photograph and sound is also treated as a track, and a movement trajectory track generated from the movement trajectory information and a content track generated from the content may be converted into a management file as one album. Accordingly, for example, the movement trajectory information may be treated as one album in appropriate units such as "Hakone tour" or "December 24."

Figure 1:
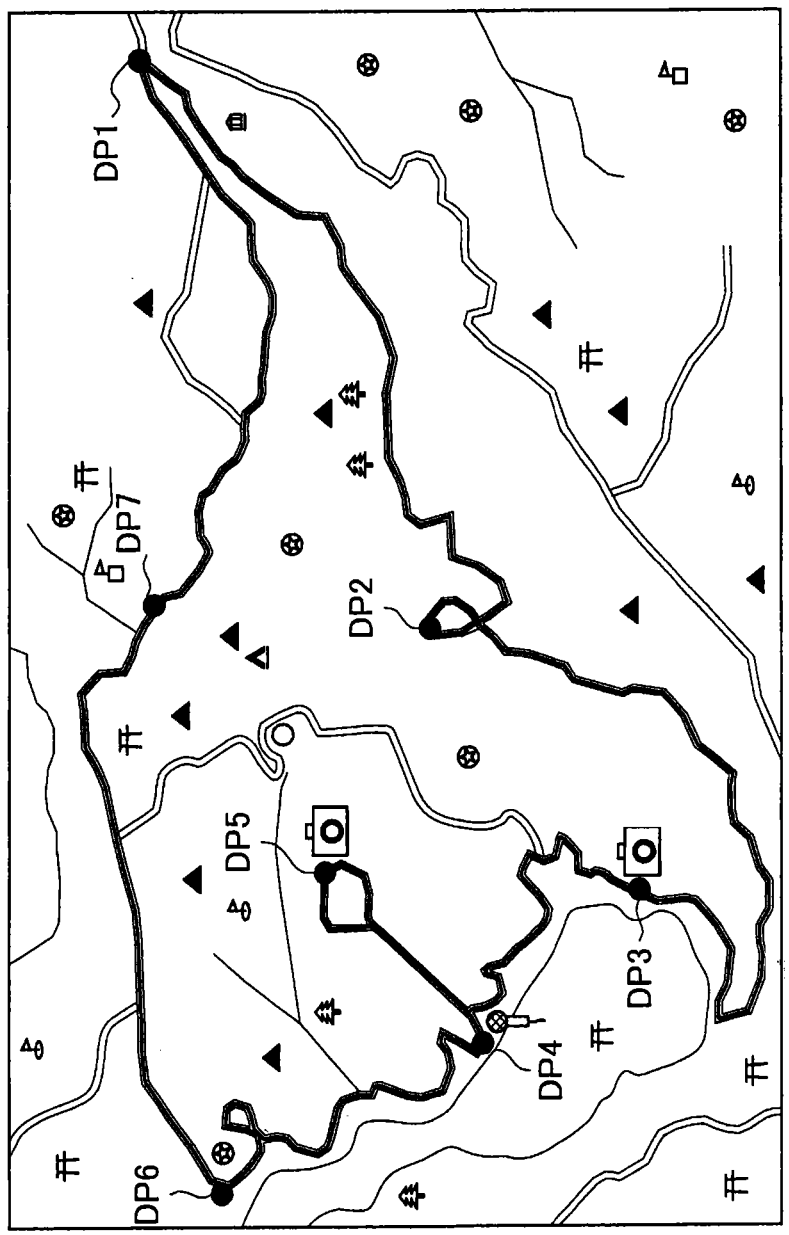
FIG. 1 is an illustrative diagram illustrating an example of movement trajectory information.
Figure 2:
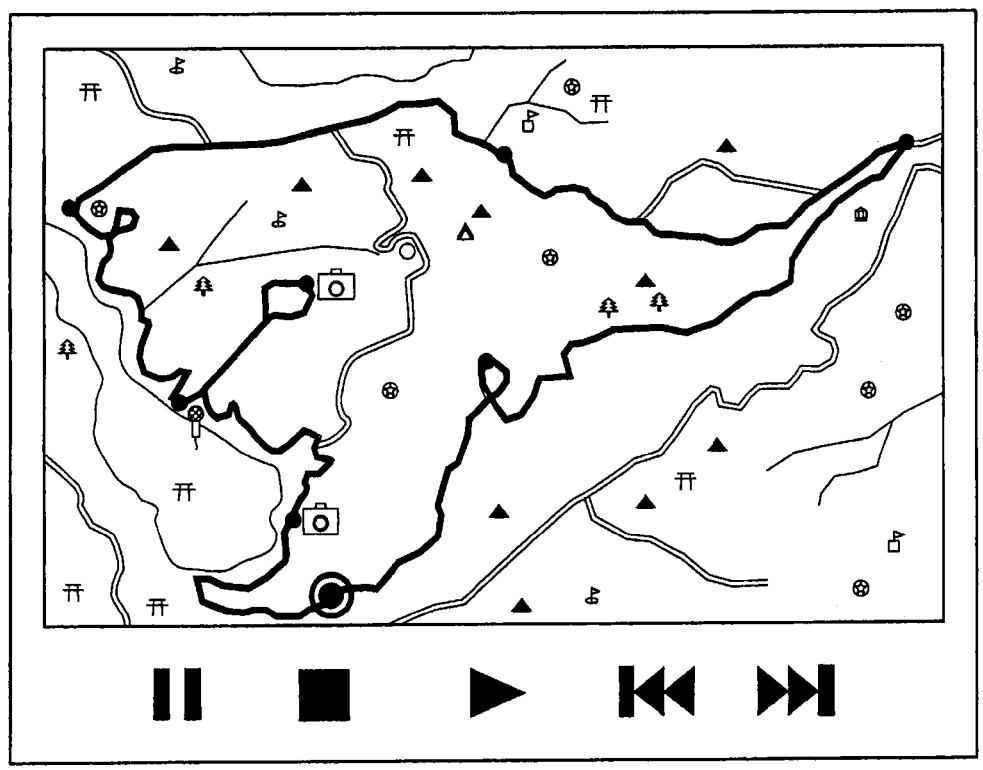
FIG. 2 is an illustrative diagram illustrating an example of playback of a movement trajectory track.

For example, one example of movement trajectory information divided into seven parts by seven division points DP1 to DP7 is illustrated in FIG. 1. The movement trajectory information divided in appropriate units may be played back to visually represent a state of a movement by moving a symbol PP indicating a playback point along the movement trajectory superimposed on the map, for example, as illustrated in FIG. 2.

In this case, playback of the movement trajectory is performed in units of tracks. Such tracks may be treated as content tracks generated from other photographs, sound or the like and the same manipulation as that in playback of a conventional music track may be made. That is, an operation such as playback, fast forward, skip, rewind, pause, stop, or frame-by-frame playback is performed according to a manipulation made by a user using an input unit.

Figure 3:
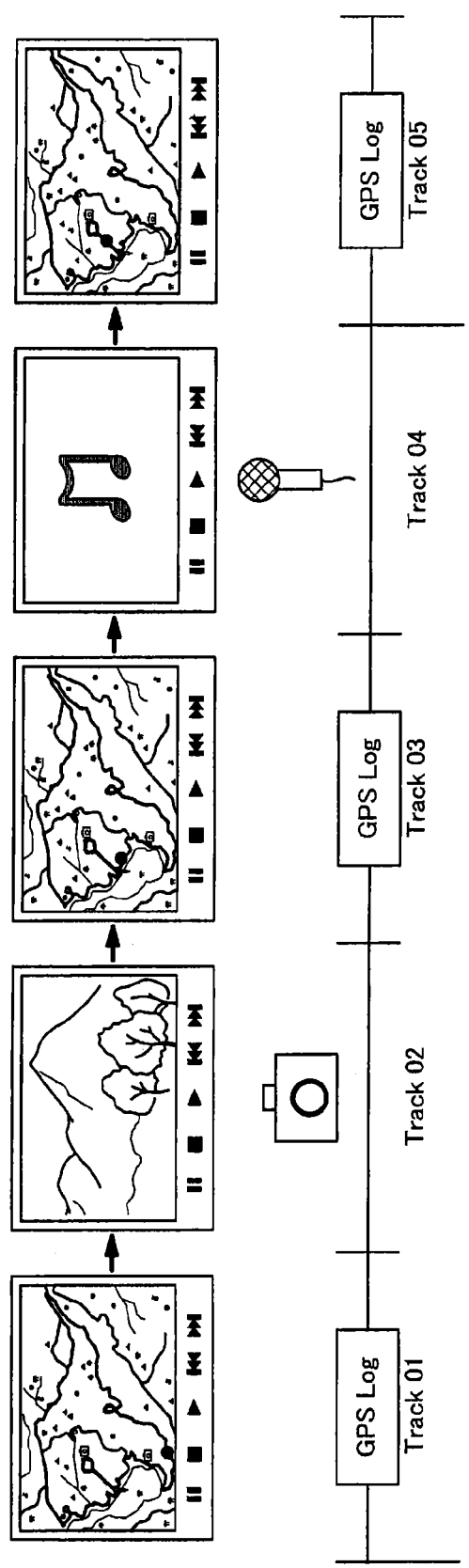
FIG. 3 is an illustrative diagram illustrating an overview of track playback.

Further, it is assumed that the movement trajectory information is divided at a time point at which a photograph has been taken and a time point at which sound has been recorded and tracks are arranged in time series. In this case, when a content group is played back, the symbol PP moves along the movement trajectory superimposed on the map. Also, when the symbol PP reaches the time point at which the photograph has been taken, the photograph is then played back. In this case, when a plurality of photographs is taken at the same point, the photographs may be played back as a slide show. Further, when playback of the photograph ends, a next movement trajectory track is played back. Also, when the symbol PP reaches the time point at which the sound has been recorded, the sound is then played back. A state of this operation is illustrated in FIG. 3.

Further, hereinafter, "GPS log," "GPS Log" and the like described in the drawings are types of the movement trajectory information. Among the movement trajectory information, a history of the position information acquired through the GPS is called a GPS log. The GPS log is described as one example, but the movement trajectory information is not limited thereto and may be other movement trajectory information. For example, a movement distance and a movement orientation are acquired using a sensor and then the position information may be calculated from detection values of the movement distance and the movement orientation. Alternatively, the position information may be calculated based on identification information of an access point and a reception signal level using wireless communication. The movement trajectory information is a concept including information in which the position information acquired using such various methods and time information is associated with each other.

Further, the movement trajectory information is not necessarily limited to history information of the position information. The movement trajectory information may be a trajectory of position information associated with the time information and, for example, may be schedule information rather than a history of actual movement. For example, the movement trajectory information serving as the schedule information may be information generated using a path search function.

A configuration for realizing such a function will be described below in detail. First, a functional configuration of a PND that is one example of an information processing apparatus having a function of acquiring position information and generating movement trajectory information in which position information is associated with time information, a function of generating a movement trajectory track that allows a user to view a state of a movement through playback from movement trajectory information, a function of generating a track list including a movement trajectory track, a function of playing back the track list, and, a function of providing information of an analysis result of the movement trajectory track will be described by way of example.

2. First Embodiment

PND

A PND 10 according to a first embodiment of the present disclosure is a device having a function of generating, editing, and playing back the movement trajectory information as described above, in addition to a navigation function. That is, the PND 10 in the present embodiment is an information processing apparatus having all functions of a navigation device, a movement trajectory information generation device, a movement trajectory information editing device, and a movement trajectory information playback device. Although the PND 10 having all the functions described above is described herein, the present technology is not limited to such an example. For example, the information processing apparatus may also be realized as a device having only some of the above-described functions.

Figure 4:
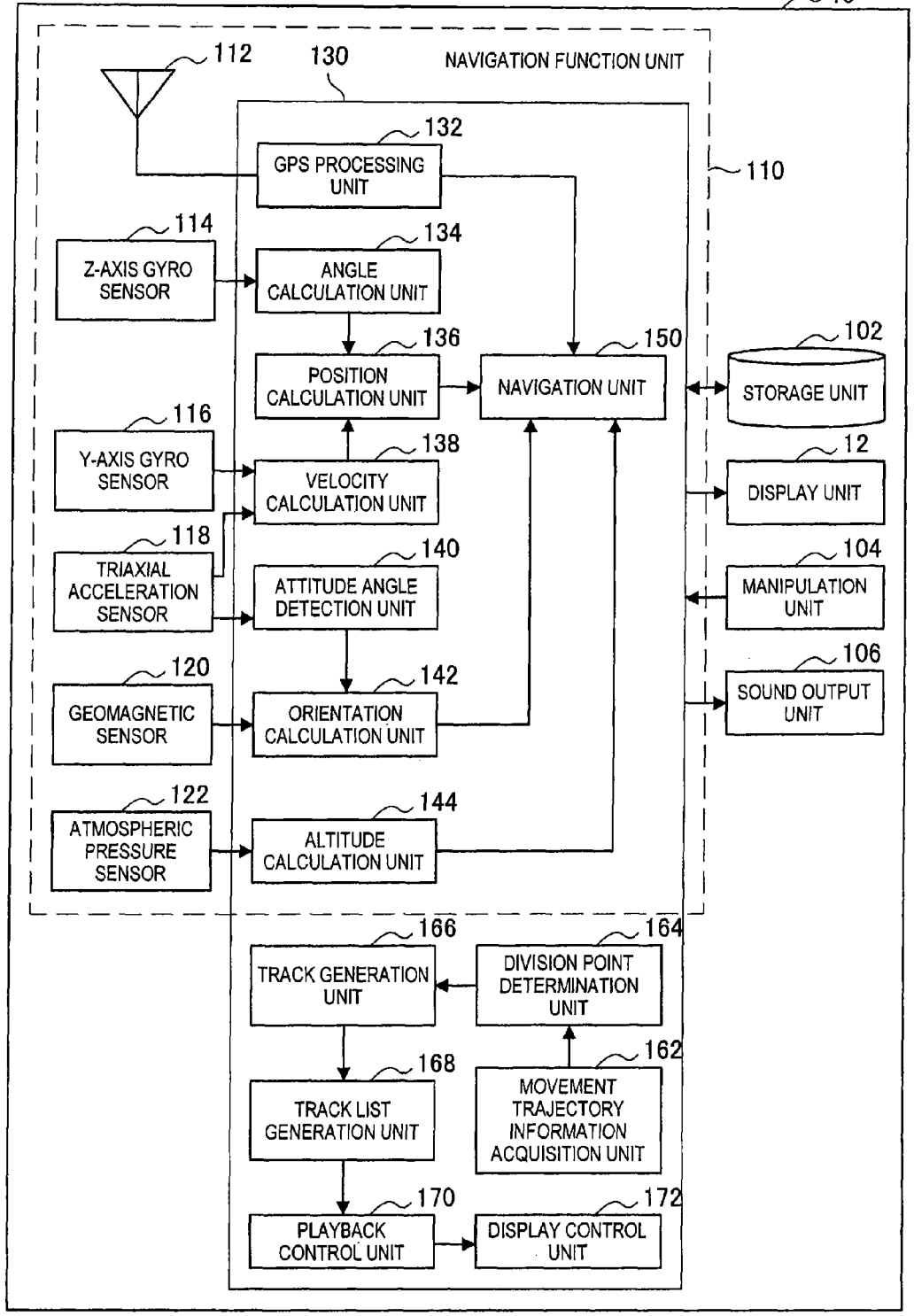
FIG. 4 is a block diagram illustrating a configuration of an information processing apparatus (PND) according to a first embodiment.

FIG. 4 is a block diagram illustrating a configuration of the PND 10 that is one example of an information processing apparatus according to the first embodiment of the present disclosure. Referring to FIG. 4, the PND 10 mainly includes a navigation function unit 110, a storage unit 102, a display unit 12, a manipulation unit 104, a sound output unit 106, a movement trajectory information acquisition unit 162, a division point determination unit 164, a track generation unit 166, a track list generation unit 168, a playback control unit 170, and a display control unit 172.

Further, a part of the navigation function unit, the movement trajectory information acquisition unit 162, the division point determination unit 164, the track generation unit 166, the track list generation unit 168, the playback control unit 170, and the display control unit 172 are realized as a function of a control unit 130 mounted by arithmetic processing means such as a CPU (Central Processing Unit).

Here, the storage unit 102 is a storage medium for storing a program for operation of the PND 10, map data and the like. Further, in the present embodiment, the storage unit 102 stores a history of position information acquired by the navigation function unit 110 as movement trajectory information.

Further, the storage unit 102 may be a storage medium, including, for example, a nonvolatile memory such as a flash ROM (or a flash memory), an EEPROM (Electrically Erasable Programmable Read-Only Memory) or an EPROM (Erasable Programmable ROM), a magnetic disk such as a hard disk or a disk-shaped magnetic disk, an optical disc such as a CD (Compact Disc), a DVD-R (Digital Versatile Disc Recordable) and a BD (Blu-Ray Disc (registered trademark)), or an MO (MagnetoOptical) disc.

The display unit 12 is a display device that outputs a display screen according to control of the control unit 130. This display unit 12 may be, for example, a display device such as a liquid crystal display (LCD) or an organic EL (Electroluminescence) display.

The manipulation unit 104 receives a manipulation instruction from a user and outputs manipulation content to the control unit 130. The manipulation instruction of the user may include various manipulation instructions relating to editing and playback of the movement trajectory information. Further, from a point of view of a navigation device, the manipulation instruction may include, for example, setting of a destination, zooming in and out of a map, voice guidance setting, screen display setting or the like.

Further, this manipulation unit 104 may be a touch screen provided integrally with the display unit 12. Alternatively, the manipulation unit 104 may be a physical configuration separate from the display unit 12 such as a button, a switch, and a lever. Further, the manipulation unit 104 may be a signal reception unit that detects a signal indicating a manipulation instruction of the user transmitted from a remote controller.

The sound output unit 106 is an output device that outputs sound data, and is, for example, a speaker. This sound output unit 106 outputs sound data related to various contents played back by the playback control unit 170. Here, examples of the output sound data may include music, recorded sound, sound effects and the like. Further, when the device functions as a navigation device, the sound output unit 106 outputs sound guidance according to navigation. The user can recognize a path to a destination without viewing the display unit 12 by listening to the sound guidance.

Figure 5:
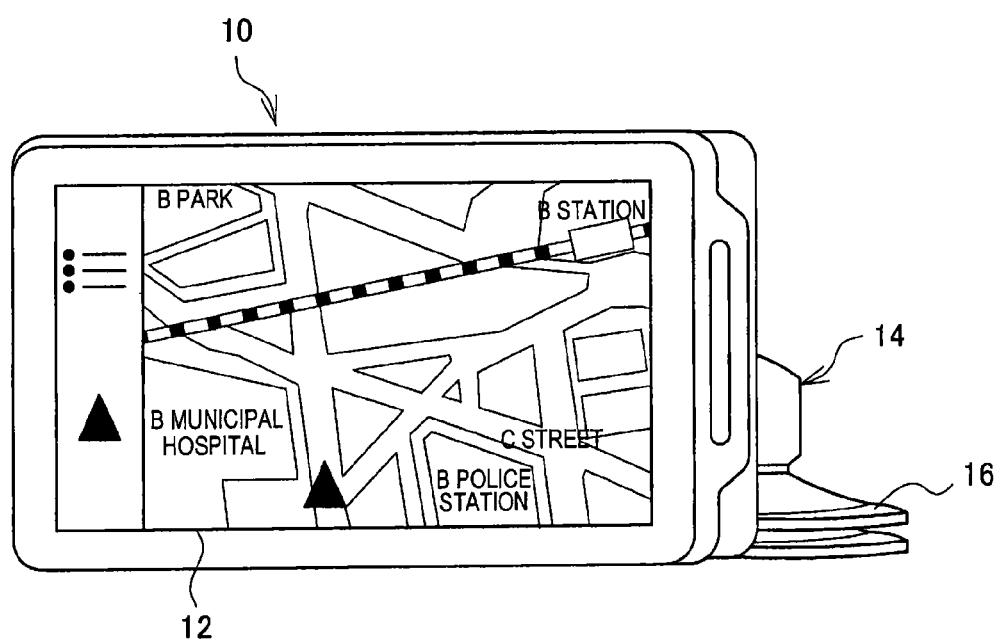
FIG. 5 is an appearance view illustrating one example of an appearance of the PND.

Here, an example of an appearance of the PND 10 will be described with reference to FIG. 5. The PND 10 includes a display unit 12 and is held by a cradle 14 attached to a dashboard of a vehicle via a suction cup 16. The PND 10 is mechanically and electrically connected to the cradle 14. Accordingly, the PND 10 is configured to operate with supply power supplied from a battery of the vehicle via the cradle 14 and to operate in an independent state with power supplied from a built-in battery even when the PND 10 is detached from the cradle 14.

[2-1. Navigation Function Unit (Generation of Movement Trajectory Information)]

Here, one example of a configuration of the navigation function unit 110 functioning as a movement trajectory information generation unit of the PND 10 will be described in detail. The navigation function unit 110 mainly includes a GPS antenna 112, a Z-axis gyro sensor 114, a Y-axis gyro sensor 116, a triaxial acceleration sensor 118, a geomagnetic sensor 120, an atmospheric pressure sensor 122, a GPS processing unit 132, an angle calculation unit 134, a position calculation unit 136, a velocity calculation unit 138, an attitude angle detection unit 140, an orientation calculation unit 142, an altitude calculation unit 144, and a navigation unit 150.

The navigation function unit 110 in the present embodiment has a function of acquiring movement trajectory information as a movement history. Further, the navigation function unit 110 may generate movement trajectory information as schedule information using a path search function or the like, but in the present embodiment, a case in which the movement history is acquired will be described hereinafter.

The GPS antenna 112 can receive GPS signals from a plurality of GPS satellites, and inputs the received GPS signals to the GPS processing unit 132. Further, here, orbit data indicating an orbit of the GPS satellite and information such as a signal transmission time are contained in the received GPS signal.

The GPS processing unit 132 calculates position information indicating a current position of the PND 10 based on the plurality of GPS signals input from the GPS antenna 112, and supplies the calculated position information to the navigation unit 150. Specifically, the GPS processing unit 132 calculates a position of each GPS satellite from the orbit data obtained by demodulating the plurality of GPS signals, and calculates a distance between each GPS satellite and the PND 10 from a difference between a transmission time and a reception time of the GPS signal. Also, a current three-dimensional position is calculated based on the calculated position of each GPS satellite and the distance between each GPS satellite and the PND 10.

The navigation function unit 110 has a function of acquiring a relative position using various sensors, in addition to an absolute position acquisition function by the GPS antenna 112 and the GPS processing unit 132. This relative position information may be used in a situation in which an absolute position cannot be acquired, i.e., a situation in which the PND 10 is present in a position at which the GPS signal cannot be received. Alternatively, information of the relative position may be used with the absolute position information.

Figure 6:
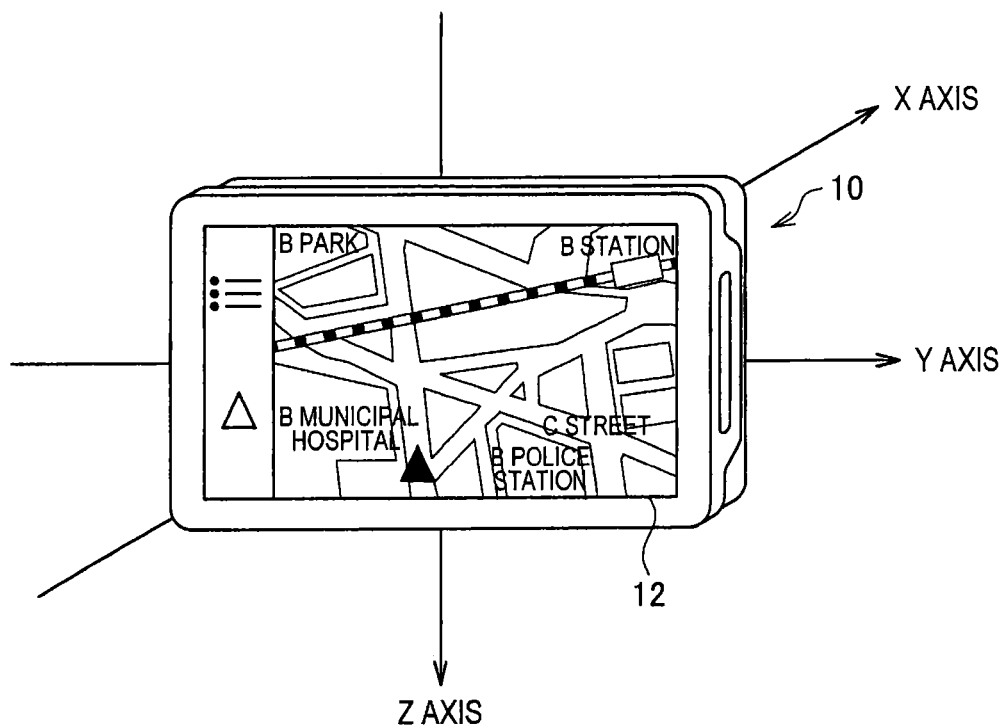
FIG. 6 is an illustrative diagram illustrating a definition of a coordinate system of the PND.

The Z-axis gyro sensor 114 is a sensor having a function of detecting, as a voltage value, a yaw rate $\omega z$ that is a velocity at which a rotation angle (angular velocity) is changed near the Z axis when the PND 10 is being turned. The Z-axis gyro sensor 114 detects this yaw rate, for example, at a sampling frequency of 50 Hz and inputs data indicating the detected yaw rate to the angle calculation unit 134. Further, as illustrated in FIG. 6, the Z axis corresponds to a vertical direction. Also, the X axis corresponds to a traveling direction of the PND 10, and the Y axis corresponds to a horizontal direction perpendicular to the X axis.

The angle calculation unit 134 calculates an angle $\theta$ when the PND 10 is turned by integrating the sampling period (e.g., 0.02 s herein) and the yaw rate on input from the Z-axis gyro sensor 114 and inputs angle data indicating the angle $\theta$ to the position calculation unit 136.

The Y-axis gyro sensor 116 is a sensor having a function of detecting, as a voltage value, a pitch rate $\omega y$ that is an angular velocity near the Y axis. The Y-axis gyro sensor 116 detects this pitch rate, for example, at a sampling frequency of 50 Hz, and inputs data indicating the detected pitch rate to the velocity calculation unit 138.

The triaxial acceleration sensor 118 is a sensor having a function of detecting acceleration $\alpha x$ along the X axis, acceleration $\alpha y$ along the Y axis, and acceleration $\alpha z$ along the Z axis as voltage values. The triaxial acceleration sensor 118 detects the acceleration $\alpha x$, the acceleration $\alpha y$, and the acceleration $\alpha z$, for example, at a sampling frequency of 50 Hz, and inputs data indicating the detected acceleration to the velocity calculation unit 138 and the attitude angle detection unit 140.

The velocity calculation unit 138 divides the acceleration $\alpha z$ along the Z axis input from the triaxial acceleration sensor 118 by the pitch rate $\omega y$ input from the Y-axis gyro sensor 116 to calculate a velocity V in the traveling direction, for example, 50 times per second, and inputs the calculated velocity V to the position calculation unit 136.

The position calculation unit 136 has a function of calculating position information of a current position based on the velocity V calculated by the velocity calculation unit 138 and the angle $\theta$ calculated by the angle calculation unit 134. Specifically, the position calculation unit 136 obtains a change amount between a position at the time of previous calculation and the current position based on the velocity V and the angle θ. Also, the position calculation unit 136 calculates current position information from this change amount and a previous position. The position calculation unit 136 then supplies the position information of the current position to the navigation unit 150.

The attitude angle detection unit 140 first performs a predetermined attitude angle detection process based on the acceleration data αx, αy and αz input from the triaxial acceleration sensor 118 to generate attitude angle data indicating an attitude angle of the PND 10, and inputs the attitude angle data to the orientation calculation unit 142.

The geomagnetic sensor 120 is a sensor for detecting geomagnetism Mx, My and Mz in an X-axis direction, a Y-axis direction, and a Z-axis direction, as voltage values. The geomagnetic sensor 120 inputs the detected geomagnetic data Mx, My and Mz to the orientation calculation unit 142.

The orientation calculation unit 142 performs a predetermined correction process on the geomagnetic data Mx, My and Mz input from the geomagnetic sensor 120 and generates orientation data indicating the orientation of the PND 10 based on the corrected geomagnetic data and the attitude angle data input from the attitude angle detection unit 140. The orientation calculation unit 142 supplies the generated orientation data to the navigation unit 150.

That is, the geomagnetic sensor 120, the triaxial acceleration sensor 118, the attitude angle detection unit 140, and the orientation calculation unit 142 function as a so-called electronic compass, and generate the orientation data. The navigation unit 150 may provide map data displayed according to the orientation of the PND 10 to the user using the orientation data mainly when the PND 10 is used while detached from the cradle 14 (e.g., when the PND 10 is used when the user is walking). Further, when the PND 10 is used while mounted on a car, a road present in the map data may be associated with a position of the car from a path of the position of the car, and map data according to the orientation of the PND 10 based on the orientation of the map may be provided to the user. Alternatively, the orientation of the PND 10 may be calculated from the acquired GPS orientation and the map data according to the orientation may be provided to the user.

The atmospheric pressure sensor 122 is a sensor having a function of detecting ambient atmospheric pressure as a voltage value. The atmospheric pressure sensor 122 detects the atmospheric pressure, for example, at a sampling frequency of 50 Hz, and inputs the detected atmospheric pressure data to the altitude calculation unit 144.

The altitude calculation unit 144 calculates an altitude of the PND 10 based on the atmospheric pressure data input from the atmospheric pressure sensor 122, and supplies the calculated altitude data to the navigation unit 150.

Using the configuration described above, the navigation unit 150 can acquire current position information from the GPS processing unit 132 or the position calculation unit 136 and acquire the orientation of the PND 10 from the orientation calculation unit 142 and the altitude of the PND 10 from the altitude calculation unit 144. Also, the navigation unit 150 acquires map data of the vicinity of the current position from the map data stored in the storage unit 102 based on the acquired information, and shows a path to the destination set by the user using the manipulation unit 104 by means of the display screen of the display unit 12 and the output sound from the sound output unit 106.

Here, the navigation unit 150 may use the acquired information on the position as it is, or may perform various corrections. For example, one typical example of a correction process may include a map matching process. The map matching process is a scheme of using the map information to correct an error of the position information. Using the map matching process, a corresponding road on the map is searched for from the change of the position information, correct position information is estimated, and the position information is corrected based on the estimation.

Further, as described above, the navigation function unit 110 also functioning as the movement trajectory information acquisition unit stores the acquired position information in the storage unit 102 to generate the movement trajectory information. This movement trajectory information may be stored information of the absolute position provided by the GPS processing unit 132. Alternatively, the movement trajectory information may be stored information of the relative position calculated from various sensors. Alternatively, the movement trajectory information may be stored position information after correction, which is generated as the navigation unit 150 executes the correction process such as map matching.

[2-2. Division of Movement Trajectory Information]

Next, a process of dividing movement trajectory information, which is one function of the PND 10, will be described. The movement trajectory information acquisition unit 162 acquires movement trajectory information containing position information and time information corresponding to the position information, and determines whether the acquired movement trajectory information is movement trajectory information that is an analysis target. Also, when the acquired movement trajectory information is the analysis target, the movement trajectory information acquisition unit 162 passes the movement trajectory information to the division point determination unit 164.

In this case, the movement trajectory information acquisition unit 162 acquires, for example, movement trajectory information stored in the storage unit 102. Alternatively, the movement trajectory information acquisition unit 162 may acquire the movement trajectory information from an external device via an interface unit that is not shown. In this case, the interface unit may be a connector connected to the external device via a cable or may be a communication interface to wirelessly connect to the external device.

The division point determination unit 164 has a function of determining a division point of the movement trajectory information input by the movement trajectory information acquisition unit 162 based on an analysis result of the movement trajectory information. In this case, the division point determination unit 164 determines the division point at which to divide the movement trajectory information in a unit suitable for playback of the movement trajectory information as a movement trajectory track.

In this case, for the unit suitable for playback of the movement trajectory information as the movement trajectory track, a scene recognized as an integral event by the user may be basically used as a criterion. The movement trajectory information is likely to contain movement trajectory information in various scenes, such as "moving on a train," "moving on foot while taking landscape photographs," "staying in a theme park" and "moving in a car." For the user, the movement trajectory information is likely to have, for example, a unit having a meaning as an integral event, such as the scene unit. As the division unit, it is effective for such scenes to be used as single criteria.

Further, as described above, since the movement trajectory track is played back with a content track generated from a photograph, sound or the like, when there is content such as a photograph or sound associated with the position information, the movement trajectory information may be divided at that time point. It is possible to play back the content such as a photograph or sound during playback of the movement trajectory information by dividing the movement trajectory information at a time point at which there is the content such as a photograph or sound associated with the position information. Further, although not shown herein, when the PND 10 has an imaging function or a sound recording function, content in which a photograph or sound acquired by a corresponding functional unit and position information are associated with each other and stored may be used for division of the movement trajectory information.

<Division Operation>

Figure 7:
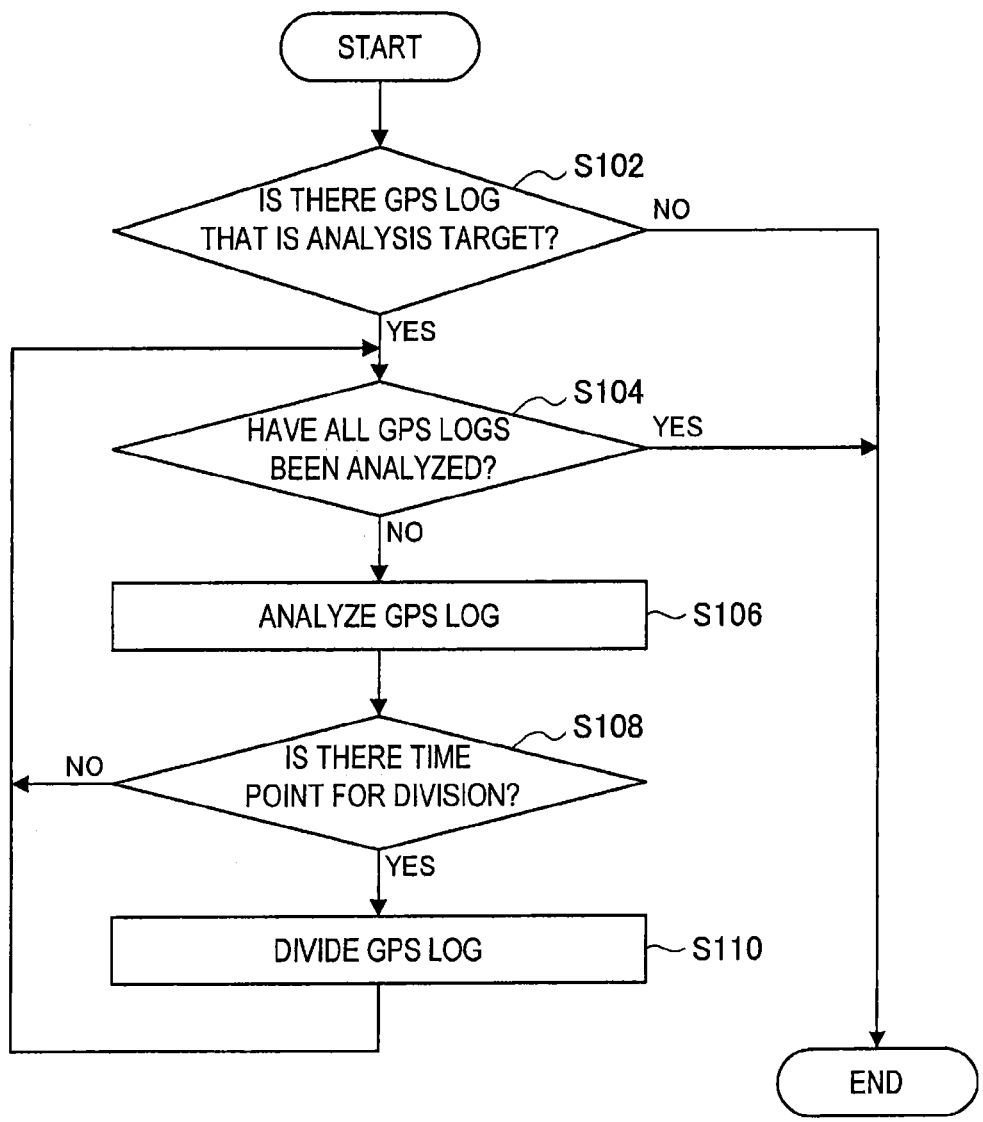
FIG. 7 is a flowchart illustrating one example of a process of dividing movement trajectory information.

Next, a flow of a process of dividing movement trajectory information that is realized by the movement trajectory information acquisition unit 162 and the division point determination unit 164 will be described using a flowchart of FIG. 7. FIG. 7 is a flowchart illustrating a flow of an operation of the process of dividing movement trajectory information in the PND 10.

The present division process starts as the movement trajectory information acquisition unit 162 acquires the movement trajectory information. Also, the movement trajectory information acquisition unit 162 determines whether there is movement trajectory information that is an analysis target in the acquired movement trajectory information (S102). Also, when there is no movement trajectory information that is an analysis target in the determination of step S102, the movement trajectory information is not subjected to the division process and the process ends.

Meanwhile, when it is determined in the determination of step S102 that there is the movement trajectory information that is an analysis target, the movement trajectory information acquisition unit 162 inputs the acquired movement trajectory information to the division point determination unit 164.

Also, the division point determination unit 164 then determines whether all movement trajectory information has been analyzed (S104). When all movement trajectory information has been analyzed, the process ends. On the other hand, when there is movement trajectory information that has not yet been analyzed, the division point determination unit 164 analyzes the movement trajectory information that has not been analyzed (S106).

The division point determination unit 164 determines whether there is a time point for division based on an analysis result of the movement trajectory information in step S106 (S108). Here, a concrete example of a detailed determination criterion of the division point in step S108 will be described below. When there is a division point in the determination of step S108, the division point determination unit 164 divides the movement trajectory information at the determined division point (S110).

Figure 8:
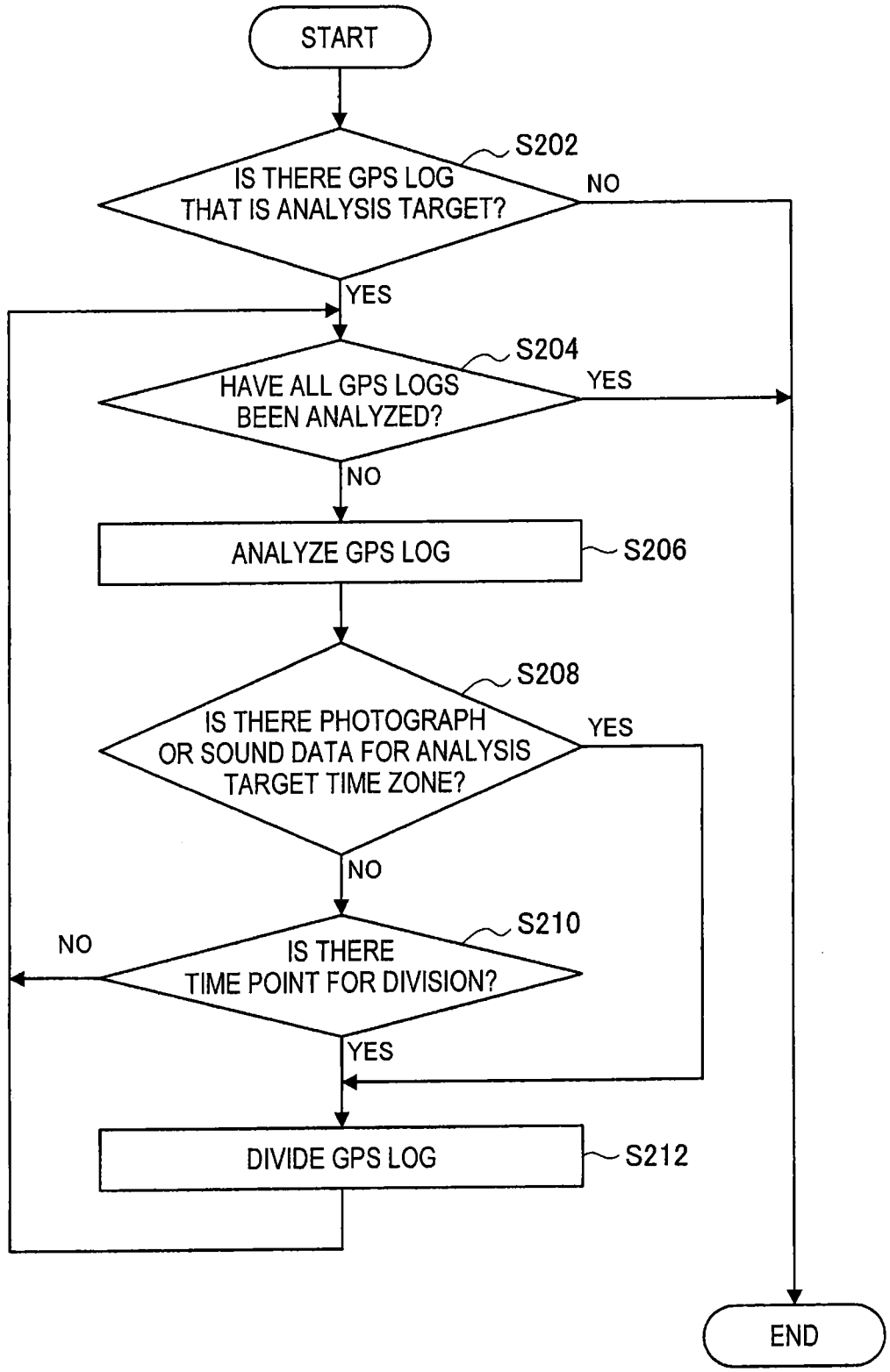
FIG. 8 is a flowchart illustrating another example of a process of dividing movement trajectory information.

Further, as described above, when there is content data such as photograph or sound data for a time zone corresponding to the movement trajectory information, it is desirable that the movement trajectory information be divided at that time point. A division process operation in consideration of this point is illustrated in FIG. 8.

Since an operation of steps S202 to S206 is the same as that of steps S102 to S106 illustrated in FIG. 7, a description thereof is omitted herein. When analysis of the movement trajectory information is performed in step S206, the division point determination unit 164 determines whether there is photograph or sound data for an analysis target time zone (S208). Here, when there is the content such as photograph or sound data for an analysis target time zone, the process proceeds to step S212 in which the division point determination unit 164 divides the movement trajectory information in a time corresponding to the content.

On the other hand, when there is no content such as photograph or sound data for an analysis target time zone, the division point determination unit 164 then determines whether there is a time point at which to divide the movement trajectory information (S210). Here, a determination criterion in step S210 will be described below in detail. When it is determined in step S210 that there is a time point for division, the division point determination unit 164 divides the movement trajectory information at the division point using the time point as the division point.

<Division Criterion>

Next, one example of a criterion used for the division point determination unit 164 to determine the division point will be described below. As described above, the division point is determined using, as a criterion, a unit suitable for playback of the movement trajectory information as a movement trajectory track. In this case, for the unit suitable for playback of the movement trajectory information as a movement trajectory track, a scene recognized as an integral event by the user may be basically used as a criterion. Further, as another example of the unit suitable for playback of the movement trajectory information as a movement trajectory track, when there is content such as a photograph or sound for a position or a time zone corresponding to the movement trajectory information, that time point may be considered as the division point.

Figure 9:
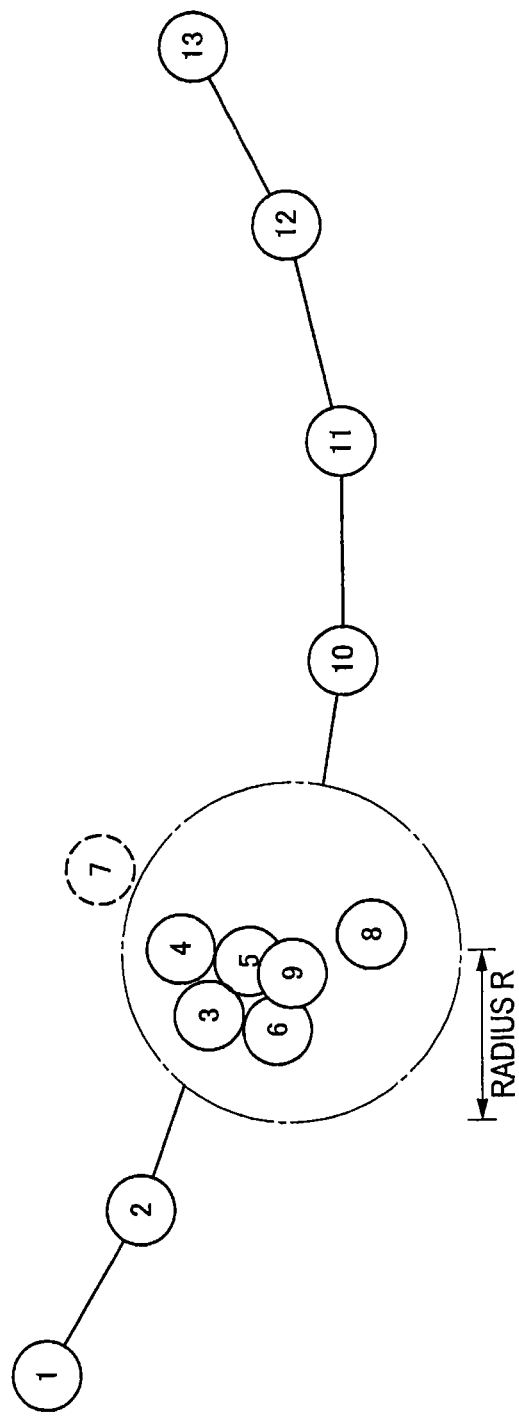
FIG. 9 is an illustrative diagram illustrating a concrete example of a division point determination based on a stay point.
Figure 10:
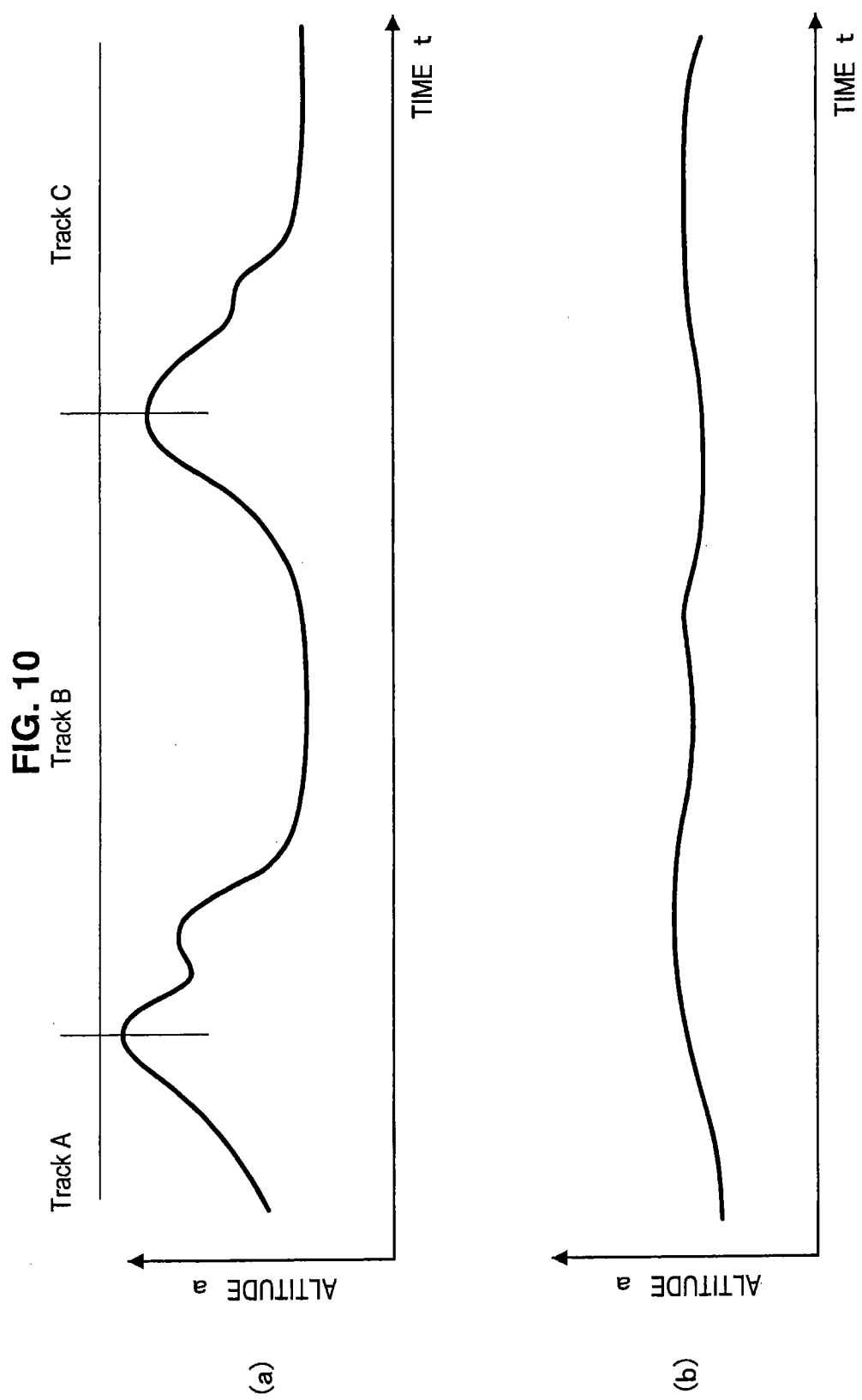
FIG. 10 is an illustrative diagram illustrating a concrete example of a division point determination based on altitude information.
Figure 11:
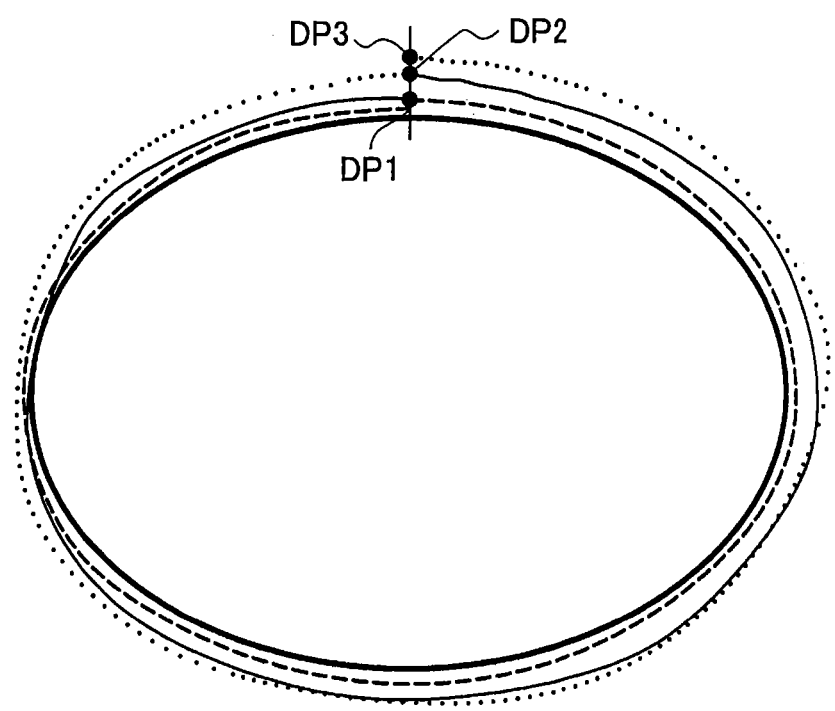
FIG. 11 is an illustrative diagram illustrating a concrete example of a division point determination in an example of a circulating movement.
Figure 12:
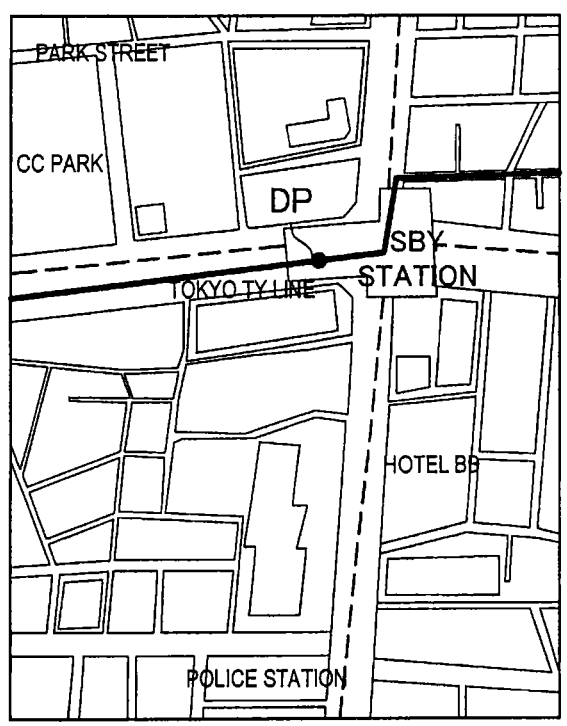
FIG. 12 is an illustrative diagram illustrating a concrete example of a division point determination based on movement means estimation.

A concrete example of the division point determination criterion will be described with reference to FIGS. 9 to 12. FIGS. 9 to 12 are illustrative diagrams illustrating a concrete example of the division point determination criterion. Specifically, FIG. 9 is an illustrative diagram illustrating a concrete example of a division point determination based on a stay point. Further, FIG. 10 is an illustrative diagram illustrating a concrete example of a division point determination based on altitude information. FIG. 11 is an illustrative diagram illustrating a concrete example of a division point determination in an example of circulating movement. FIG. 12 is an illustrative diagram illustrating a concrete example of a division point determination based on estimation of movement means.

(Division Based on Stay Part)

First, referring to FIG. 9, thirteen pieces of position information including first position information to thirteenth position information are illustrated. Among them, six pieces of position information including the third to ninth position information except for the seventh position information indicate positions in a range of a radius R. In this case, the division point determination unit 164 determines a part of the third to ninth position information in this movement trajectory information as a stay part.

A determination criterion for the stay part may include, for example, i or more pieces of position information continuously falling in a distance range defined by the radius R or the like or position information continuously falling for t hours or more in the range of the radius R. In this case, position information departing from the range of the radius R (e.g., the seventh position information in FIG. 9) may be allowed up to s %. The stay position may be obtained by a center of a set circle and a position center of gravity in the circle.

When the movement trajectory information contains the stay part, the division point determination unit 164 may determine the division point from the stay part. For example, the division point determination unit 164 may use, as the division point, at least any one of a start point of the stay part, an end point of the stay part (a time point at which a movement starts again), and a middle point between the start point and the end point.

For example, the division point determination unit 164 may determine any one of the start point, the end point, and the middle point between the start point and the end point of the stay part as the division point. Alternatively, the start point and the end point of the stay part may be used as the division point, and the division point may be determined in such a manner that the stay part can be a stay track. This stay track is a type of a movement trajectory track, and is played back to represent the stay part. The stay track may be used to represent a connection of a time.

(Division Based on Altitude Information)

Further, referring to FIG. 10, altitude changes of movement trajectory information (a) and movement trajectory information (b) in time series are illustrated. When position information contains altitude information, the division point determination unit 164 may analyze the altitude information to determine the division point. For example, the division point determination unit 164 may use a peak time point of the altitude as the division point. In this case, when a track interval is not an appropriate value if all peak points are divided, "a peak interval of a certain distance or more," "a small inclination angle before and after the peak" or the like may be used as a peak determination criterion.

Further, in this case, the peak point is determined using a gradient greater than or equal to a certain value as a criterion based on the altitude information. Accordingly, since the gradient for the movement trajectory information (b) is smaller than a predetermined value, the division point is not determined based on the altitude information.

(Division for Circulating Movement)

Referring to FIG. 11, a movement trajectory of a circulating movement and division points DP1 to DP3 are illustrated. For example, for movement trajectory information indicating a circulating movement in a playing field, a running course or the like, the division point determination unit 164 may use a time point at which the movement is returned to the same point as the division point. As the time point at which the movement is returned to the same point is used as the division point, for example, a use method such as analysis of a lap time per circulation may be considered.

(Division Based on Estimation of Movement Means)

Referring to FIG. 12, a movement trajectory near a station is illustrated. This movement trajectory information is estimated as moving on a road in front of a station, entering the station, and boarding a train. The division point determination unit 164 may use a time point DP estimated as the train boarding time as the division point. In this case, the division point determination unit 164 may use a part in which a velocity is rapidly changed from a velocity change of the movement trajectory information as the division point. Further, the division point determination unit 164 may estimate a state of the user based on at least one of the position information and the velocity change information to determine the division point.

For example, when position information indicates a station and then indicates moving on a railway track, the division point determination unit 164 may estimate that the user has boarded a train and use a time point at which the user boarded the train, as the division point. In this case, the division point determination unit 164 may obtain a velocity from a change of the position information when the user is moving on the railway track, estimate a movement means based on the velocity, and determine the division point.

OTHER DIVISION EXAMPLES

In addition to the above criteria, various division criteria may be considered. For example, a division point may be determined at a part in which movement trajectory information is missing. In this case, similar to the stay part, the division point may be determined based on at least one of a start point of the missing part, an end point of the missing part, and a middle point between the start point and the end point. Using at least one of the start point of the missing part, the end point of the missing part, and a middle point between the start point and the end point as the division point, the movement trajectory information may be divided. Alternatively, the start point and the end point of the missing part may be used as the division point, and the division point may be determined in such a manner that a missing track indicating the missing part is obtained.

Alternatively, as described above, when there is content data such as a photograph or voice memo, the division point determination unit 164 may use a time point at which positions or times in which the content is captured or recorded match as the division point. Alternatively, the division point determination unit 164 may simply determine the division point automatically at a time at which a date changes, at certain intervals, or at a designated time.

<Variant of Division Operation (Division in Real Time)>

In the above description, the example in which the division process is performed on the accumulated movement trajectory information has been described with reference to FIGS. 7 and 8, but the present technology is not limited to such an example. The division process may be performed in real time. That is, an analysis and division process may be performed on movement trajectory information that is being recorded.

Figure 13:
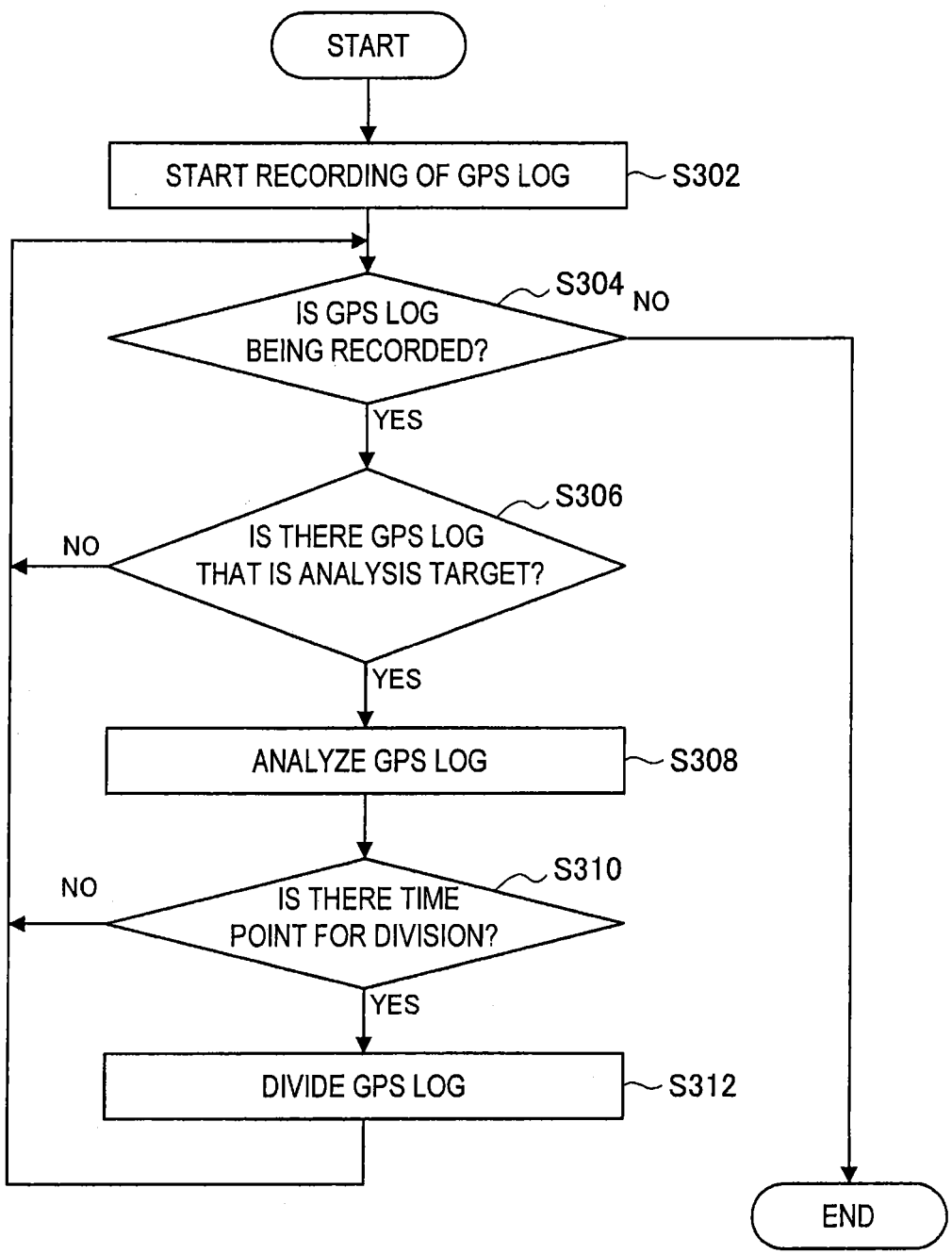
FIG. 13 is a flowchart illustrating a variant of a process of dividing movement trajectory information.

The division process operation in this case is illustrated in FIG. 13. FIG. 13 is a flowchart illustrating a variant of the process of dividing movement trajectory information. Operation illustrated in FIG. 13 starts as the navigation function unit 110 begins to record position information as the movement trajectory information (S302).

First, the movement trajectory information acquisition unit 162 determines whether a recording operation of the movement trajectory information continues when the navigation function unit 110 starts recording the movement trajectory information (S304). Also, operation of steps S306 to S312 shown below is repeatedly performed until the recording operation ends. When the recording operation of the movement trajectory information ends, the process of the present flowchart ends.

Meanwhile, when the recording operation of the movement trajectory information continues, the movement trajectory information acquisition unit 162 determines whether there is movement trajectory information that is an analysis target (S306). When there is movement trajectory information that is an analysis target, the movement trajectory information acquisition unit 162 passes the movement trajectory information to the division point determination unit 164.

Also, the division point determination unit 164 analyzes the movement trajectory information passed from the movement trajectory information acquisition unit 162 (S308). The division point determination unit 164 determines whether there is a time point for division from a result of the analysis (S310). When there is a time point for division, the division point determination unit 164 uses the time point as a division point, and divides movement trajectory information at the division point, (S312).

Further, although not shown, when the PND 10 has an imaging function or a sound recording function and a division process is performed while the movement trajectory information is being recorded, the movement trajectory information may be divided when the imaging or sound recording function starts up.

[2-3. Track Generation]

The functional configuration of the PND 10 will be continuously described with reference to FIG. 4. The PND 10 may generate a movement trajectory track from the movement trajectory information divided by the division point determination unit 164 described above, using the function of the track generation unit 166.

The track generation unit 166 has a function of generating the movement trajectory track from the movement trajectory information based on the division point. Further, the track generation unit 166 may generate a content track from the content data such as the photograph or the voice memo. Specifically, the track generation unit 166 has a function of converting data into a format that can be played back as a track and adding various attribute parameters relating to the track.

The track generation unit 166 may add an attribute parameter to each track according to a predetermined format. For example, the track generation unit 166 has a function of adding attribute parameters such as a track name, a name indicating a position, date and time, a movement distance, a required time, movement means, or the like to the movement trajectory track. The track generation unit 166 has a function of automatically adding the attribute parameter and a function of editing the attribute parameter according to input information from the manipulation unit 104.

For example, the track generation unit 166 may name the track based on the position information contained in the movement trajectory information. The track generation unit 166 may combine information such as an address, a street name, a regional name, and a proper name to generate the track name. For example, examples of the track name based on the position information may include "near an intersection A of National Route 1," "station B," "1-chome, C-cho, Konan-ku" and the like. In this case, the position information may be any one of a start point and an end point of the track. Alternatively, the track generation unit 166 may extract a representative place name from the position information included in the track. Further, a combination of the start point and the end point of the track may be used. For example, one example of the track name in the case of the combination may include "near an intersection A of National Route 1~near an intersection D of National Route 1."

Further, the track generation unit 166 may name the track based on the time information contained in the movement trajectory information. The track generation unit 166 has a function of generating the track name, for example, based on one of the start time and the end time of the track. Alternatively, the track generation unit 166 may combine the start time and the end time of the track to generate the track name. For example, examples of the track name based on the time information may include "11:20," "11:20~11:55" and the like.

Since it is desirable for the track name to be identifiable, the track generation unit 166 assigns track names in such a manner that the track names of the respective tracks do not overlap. For example, the track generation unit 166 may extract a name indicating a used position so that the track names do not overlap. Alternatively, when the track names overlap, a code for identity may be added to the name indicating the position. Alternatively, the position information and the time information may be used together.

Further, the track generation unit 166 may add movement means to the track as the attribute parameter of the track based on the movement trajectory information. Here, for example, the PND 10 has operation modes such as a vehicle mode, a bicycle mode, and a walk mode, and when operation mode switching information is contained in the movement trajectory information, the track generation unit 166 may determine the movement means using such information. Alternatively, the track generation unit 166 may determine the movement means from the analysis result of the movement trajectory information. For example, when the position information of the movement trajectory information indicates movement on a sea, a lake or the like, the track generation unit 166 may estimate that the movement means is a ship. Further, when the position information indicates movement on a railway track, the track generation unit 166 may estimate that the movement means is a train in consideration of a movement velocity.

The track generation unit 166 may use a movement means parameter when assigning the track name described above. For example, when the track generation unit 166 estimates that the movement means is a ship, the track name may be "ship." Alternatively, the track generation unit 166 may combine the movement means with at least one of the time information and the position information to assign the track name. For example, the track generation unit 166 may assign "ship AA harbor~BB harbor" or the like as the track name.

Further, the track generation unit 166 may associate various contents with each track. The track generation unit 166 may associate the content with the track according to the input information from the manipulation unit 104. Alternatively, when the position information has been added to each content, the track generation unit 166 may associate the content with a track having movement trajectory information near the position information added to the content. Here, examples of the associated content may include a photograph, a text memo and the like. The content associated with the track may be provided to the user together with the position information, for example, when the track is played back. Accordingly, it is desirable for the content associated with the track to be content related to position information of the track. For example, a photograph of a landscape located at a position included in the track that is a target may be considered as the photograph associated with the track. Alternatively, when a text memo is associated with the track, content described in the text memo may include information of landscape on a path of the track, a state of a road, a reason for which the road was selected, and a feeling of the path. Further, when the track that is the target is generated from the movement trajectory information as schedule information, the track generation unit 166 may associate a memo describing a note of a route, a selection reason or the like as a description for other persons with the track at a time point at which a schedule is established.

Further, the content is the photograph or text memo herein, but is not limited thereto. For example, the content associated with the track may be a voice memo, an animation, an illustration, or the like.

[2-4. Track List Generation]

The track list generation unit 168 has a function of generating a track list that is a list of track groups including at least a movement trajectory track generated from the movement trajectory information containing position information and time information corresponding to the position information.

A content track generated from the content data such as the photograph or the voice memo may be included in the track list.

Further, the track list generation unit 168 may add a name to the track list. This name may be, for example, based on at least one of the position information and the time information, similar to the track name. For example, examples of the track list name may include "behavior on December 25," "Hakone" and the like. Further, when the PND 10 has a scheduler function, the track list generation unit 168 may name the track list based on information in a scheduler and the movement trajectory information. For example, when there is a schedule "studytour@Hakone" on December 25, a name of a track list generated from the movement trajectory information of December 25 may be "study tour."

[2-5. Track Playback]

The playback control unit 170 has a function of controlling playback of the movement trajectory track and the content track. The playback control unit 170 can sequentially play back the tracks included in the track list if a manipulation using the manipulation unit 104 is not made when the track list is played back. Further, the playback control unit 170 may have a function of random playback, like playback of music tracks.

When the movement trajectory track is played back, the playback control unit 170 can cause the display control unit 172 to display the playback screen in which the symbol indicating position information is superimposed on the map. Further, when a photograph track generated from a photograph among the content tracks is played back, the playback control unit 170 causes the display control unit 172 to display a playback screen including photograph data. The playback control unit 170 displays the playback screen including the photograph data within a playback time set in the content track in advance.

In this case, when music data or like played back with playback of the movement trajectory track or the photograph track is set in the track, the playback control unit 170 may perform control so that the set music data is simultaneously played back.

Figure 14:
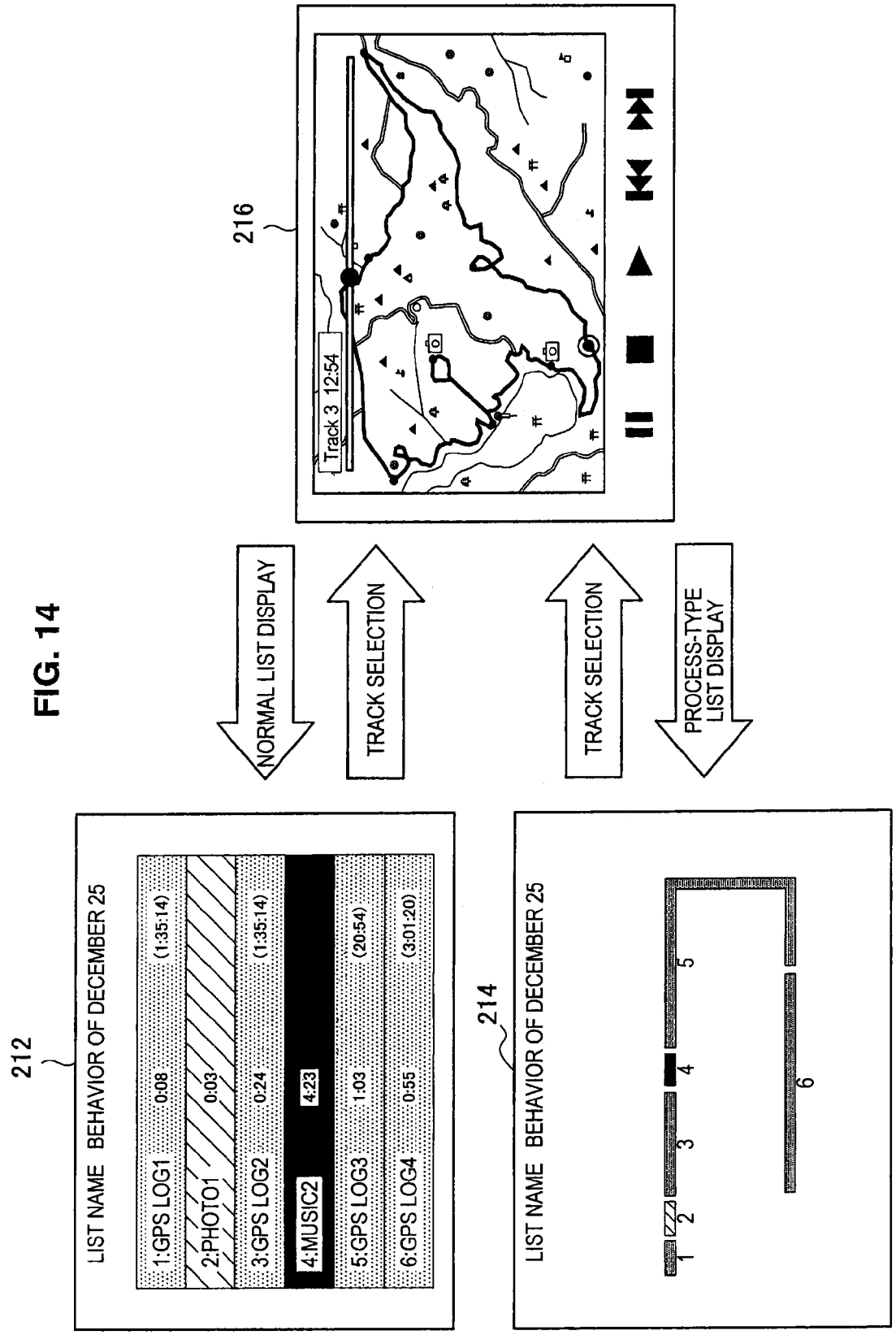
FIG. 14 is an illustrative diagram illustrating an example of screen transition of a list screen and a playback screen.

In this track playback, the display control unit 172 mainly displays a list screen for displaying the track list and a playback screen displayed at the time of playback of each track. For example, the display control unit 172 may mainly provide a normal list screen 212 in which a track list including both the movement trajectory track and the content track is displayed in a table format, a process-type list screen 214 in which the track list is displayed in a process type, and a playback screen 216 for each track, as illustrated in FIG. 14. FIG. 14 is an illustrative diagram illustrating an example of the screen displayed by the display control unit.

The display control unit 172 may switch the normal list screen 212, the process-type list screen 214, and the playback screen 216 based on the input information from the manipulation unit 104. For example, when one track is selected in the normal list screen 212 or the process-type list screen 214, the display control unit 172 displays the playback screen 216 for the selected track.

For example, if one track is selected and playback of the selected track starts, the playback control unit 170 sequentially plays back the tracks in a track list order (or a randomly selected order in the case of random playback), as illustrated in FIG. 3, when there is no manipulation input from the manipulation unit 104.

Further, when there is a manipulation input from the manipulation unit 104, the playback control unit 170 performs control according to the manipulation input. For example, when a fast forward manipulation is input, the playback control unit 170 plays back the track that is being played back at a higher speed than a normal speed. Further, when a forward skip manipulation is made, the playback control unit 170 moves a playback position to the beginning of a track scheduled to be played back subsequently to the track that is being played back.

<List Screen>

Figure 15:
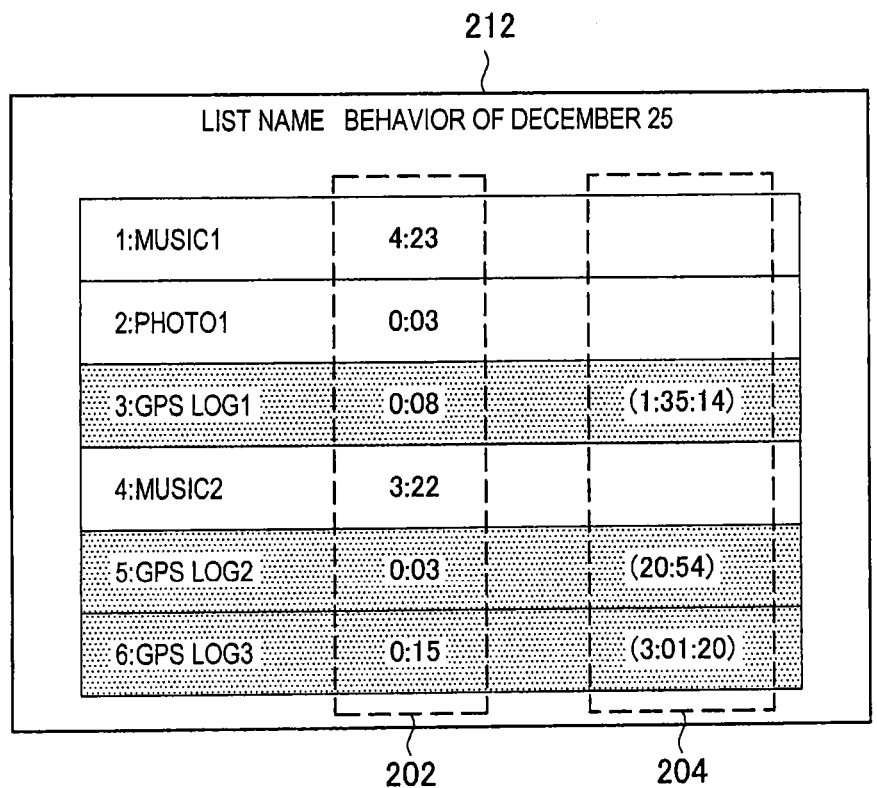
FIG. 15 is an illustrative diagram illustrating an example of a normal list screen.
Figure 16:
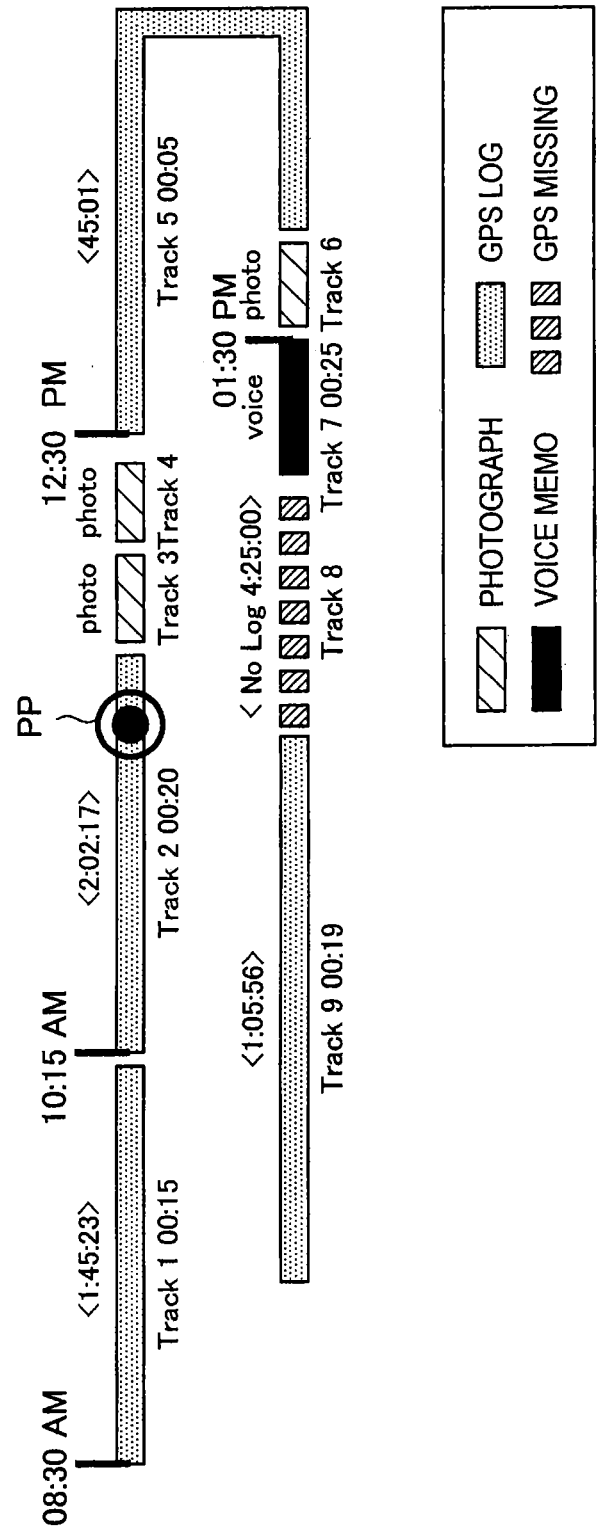
FIG. 16 is an illustrative diagram illustrating an example of a process-type list screen.
Figure 17:
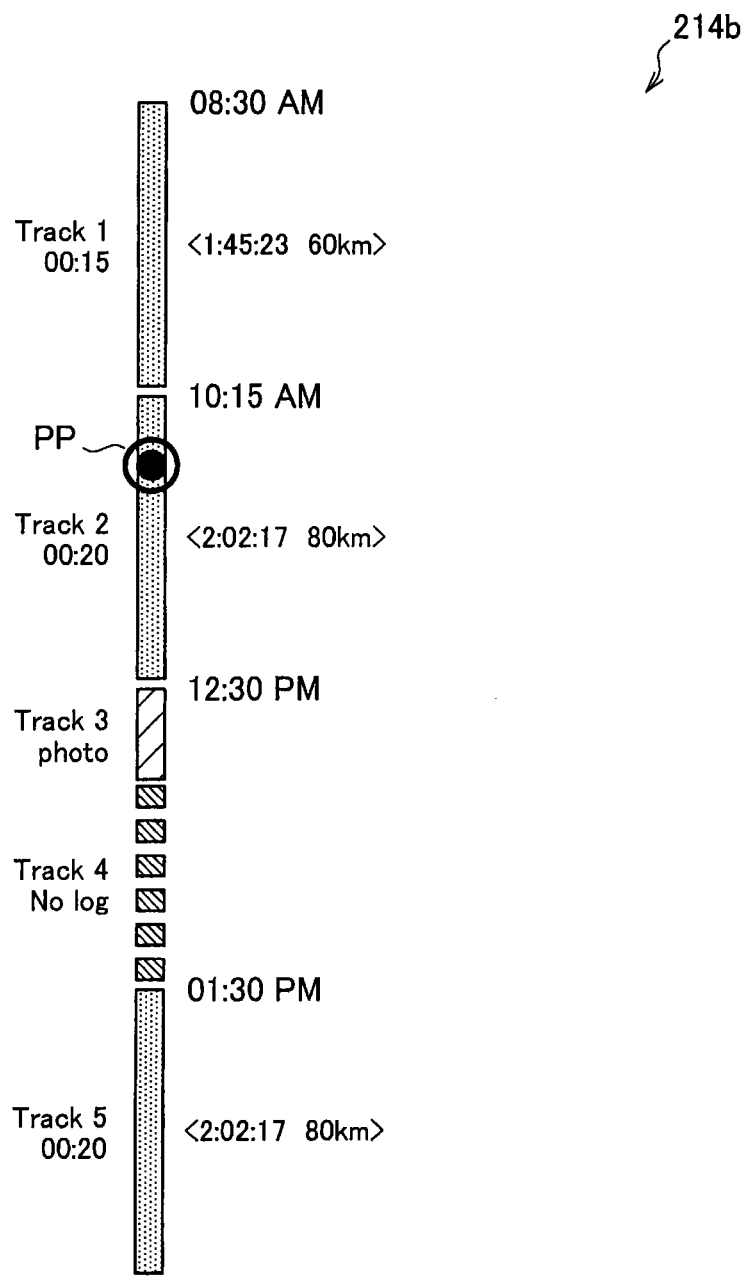
FIG. 17 is an illustrative diagram illustrating another example of a process-type list screen.

Here, the normal list screen 212 and the process-type list screen 214 will be described with reference to FIGS. 15 to 17. FIG. 15 is an illustrative diagram illustrating an example of the normal list screen, FIG. 16 is an illustrative diagram illustrating an example of the process-type list screen, and FIG. 17 is an illustrative diagram illustrating another example of the process-type list screen.

For example, attribute parameters such as a track name and time information are displayed in the normal list screen 212. In this case, the normal list screen 212 may include time information 202 required for playback of each track. Further, the normal list screen 212 may include, particularly, time information 204 actually required for a movement in relation to the movement trajectory track.

Further, although not shown, the normal list screen 212 may include some or all of the attribute parameters added to each track. That is, the display control unit 172 may display the normal list screen 212 including the attribute parameters such as a track name, a name indicating a position, a date and time, a movement distance, a required time, movement means, and the like.

Further, when manipulation information to designate the attribute parameters from the manipulation unit 104 for the normal list screen 212 is input, the display control unit 172 may display the normal list screen 212 in which the order is sorted based on the designated attribute parameters. Alternatively, when a search keyword is designated for the normal list screen 212, the display control unit 172 may display the normal list screen 212 in which a list of tracks matching the designated search keyword is displayed.

The process-type list screen 214 is a screen in which a track list is represented in a process type. For example, the process-type list screen 214 represents tracks arranged in time series as bars. It is desirable for this bar to be represented by different colors and shapes according to types of the tracks. The bar indicating the tracks may be represented by a length according to a playback time of the track or an actual movement time.

Referring to FIG. 16, one example of the process-type list screen 214 is illustrated. Related time information is shown for each track. For example, the process-type list screen 214a includes time information associated with position information of each track, information of a time length required for a movement from the start of the track to the end of the track, and information of a time length required for playback of the track.

For example, it is seen from the process-type list screen 214a that, for Track1, a movement starts at 8:30 AM, a movement time length is 1:45:23, and a time required for playback is 15 seconds. Further, while the representation using a time as a criterion has been mainly described herein, the display control unit 172 may display a name indicating a position from the position information of the track to be associated with each track.

Further, when the track list included in the process-type list screen 214 is being played back, the display control unit 172 may perform display with the symbol PP indicating the playback position superimposed on a place indicating a playback position of a bar indicating the track that is being played back.

Such display enables the user to recognize the track that is being played back and the playback position of the track. This process-type list screen 214 may be represented by vertical writing as illustrated in FIG. 17. Further, in this process-type list screen 214, the missing track or the stay track may be displayed with different representations so that the missing track or the stay track can be distinguished from other tracks. For example, a difference in tracks may be represented by any one of a color, a pattern, and a shape of the bar indicating a track.

<Playback Screen>

Figure 18:
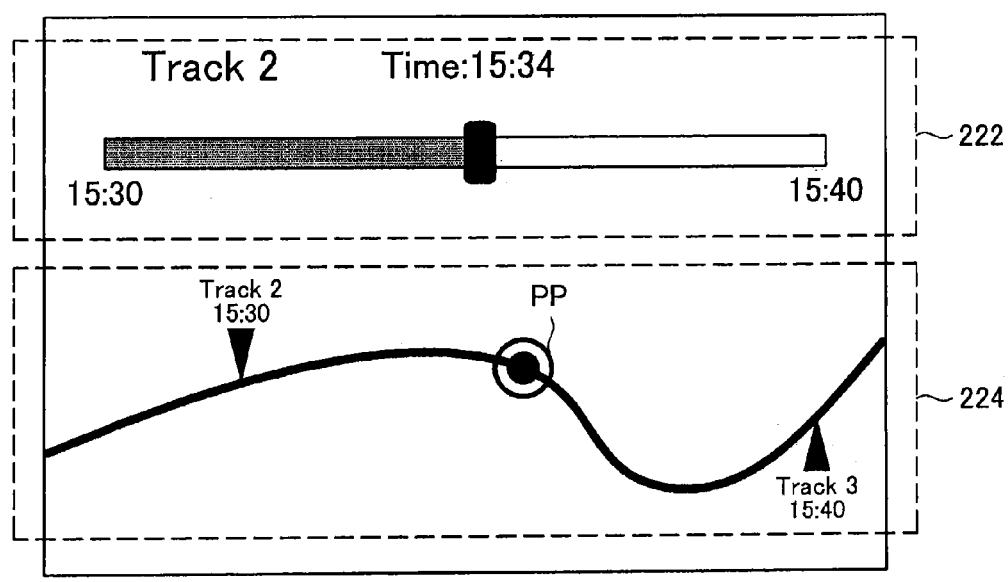
FIG. 18 is an illustrative diagram illustrating an example of a playback screen for a movement trajectory track.

Next, a playback screen for the movement trajectory track will be described with reference to FIGS. 18 to 26. First, FIG. 18 is an illustrative diagram illustrating an example of the playback screen for the movement trajectory track. The playback screen for the movement trajectory track mainly includes a progress bar part 222 and a movement trajectory display part 224.

The progress bar part 222 includes a progress bar that graphically represents a percentage of a track that has already been played back when an entire track that is being played back is 100%, and a name of the track that is being played back, and a time in a movement trajectory of a playback position at that time point. Further, a time of a start point of the track and a time of an end point of the track may be displayed at a start and an end of the progress bar.

Figure 19:
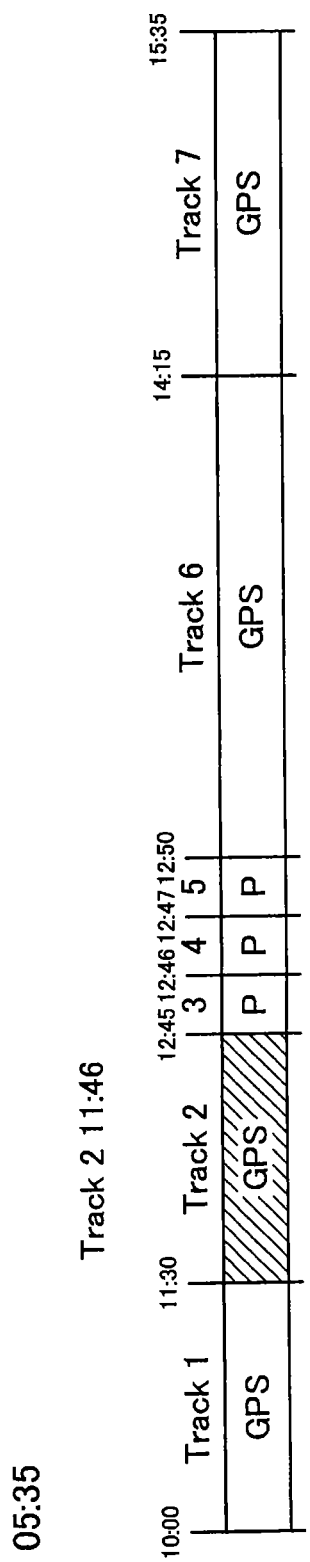
FIG. 19 is an illustrative diagram illustrating another method of displaying a progress bar part.

FIG. 19 is an illustrative diagram illustrating another method of representing the progress bar part 222. While the progress bar is displayed for the track that is being played back in FIG. 18, all tracks included in the track list are represented as the progress bar in FIG. 19. In this case, it is desirable for the track that is being played back to be identifiable, for example, by a method such as changing a color of the bar. For example, for the track that is being played back, a time of a playback time point may be displayed above the bar.

Further, each track may be represented in such a manner that a type of a track is identifiable. Further, the progress bar part 222 may include a movement time length of all the tracks. For each track, a start time of a movement trajectory track may be displayed. For example, a photography time or the like for a content track of a photograph or the like may be displayed.

The description will continue with reference to FIG. 18. The movement trajectory display part 224 may include a movement trajectory, a division point of each track, a time of a start point of each track, and a symbol PP indicating a playback position. An example in which the track that is being played back is enlarged and displayed is illustrated in FIG. 18, but the present disclosure is not limited thereto and the movement trajectory may be superimposed on the map including an entire movement range, as illustrated in the playback screen 216 of FIG. 14. Further, it is desirable for the movement trajectory to be superimposed and represented on the map as in FIG. 14, although this is omitted from FIG. 18.

Figure 20:
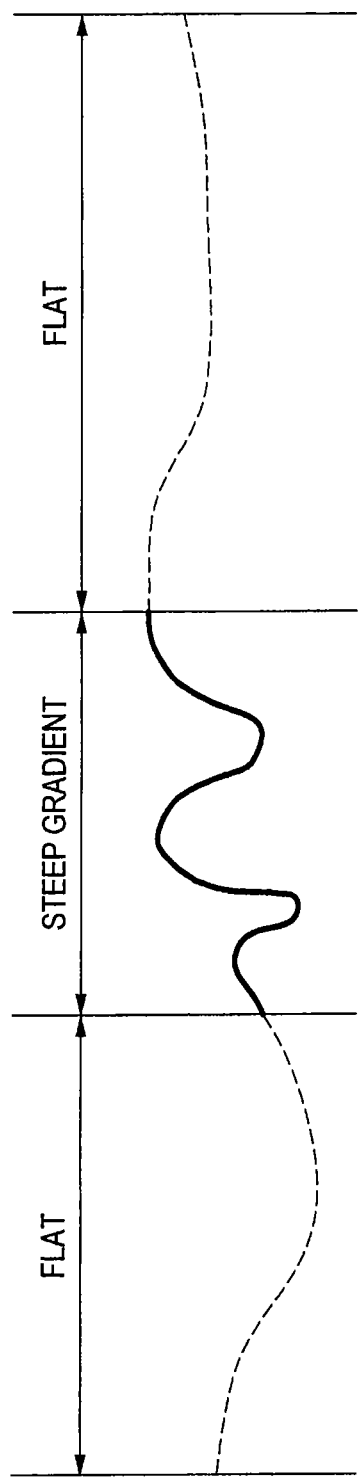
FIG. 20 is an illustrative diagram illustrating an example of a trajectory representation based on the altitude information of a movement trajectory.
Figure 21:
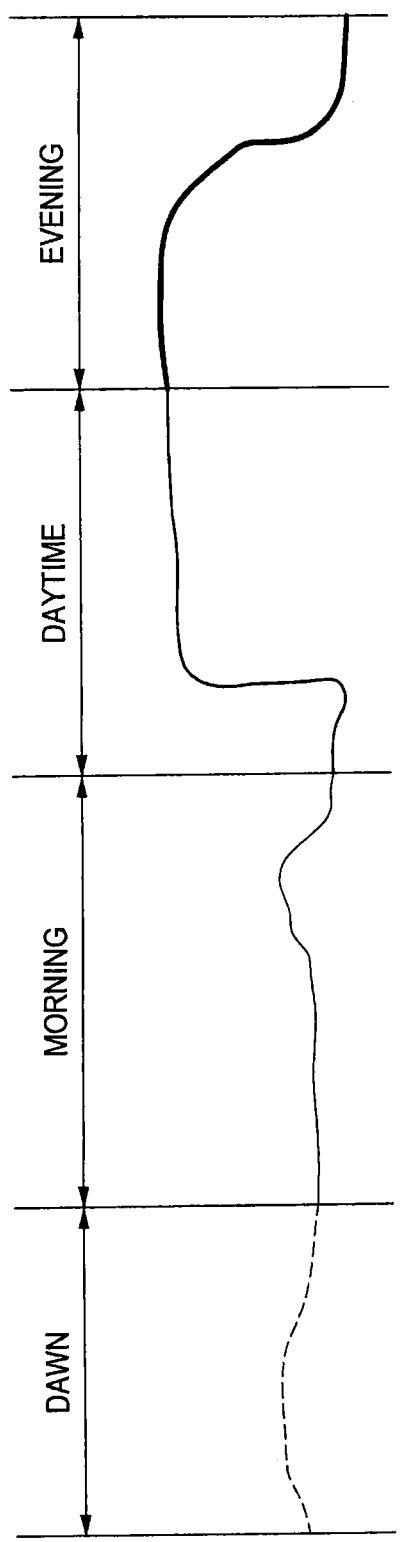
FIG. 21 is an illustrative diagram illustrating an example of a trajectory representation based on time information associated with a movement trajectory.
Figure 22:
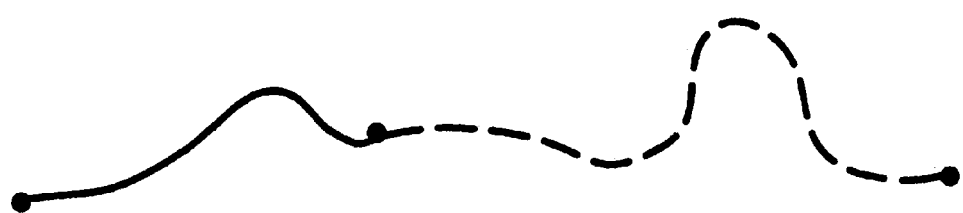
FIG. 22 is an illustrative diagram illustrating an example of a trajectory representation based on whether a track is being played back.
Figure 23:
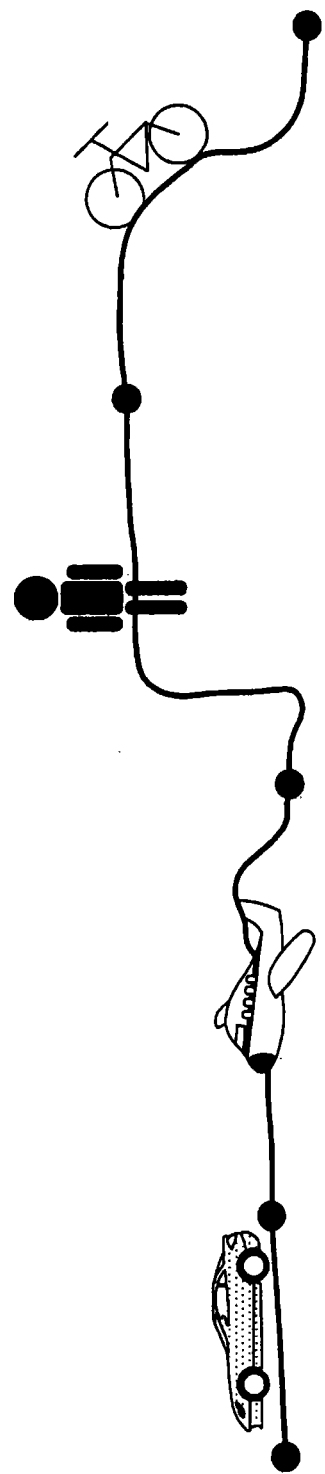
FIG. 23 is an illustrative diagram illustrating an example of a symbol representation indicating a playback position based on movement means.

Adding various ideas to the representation of the movement trajectory display part 224 may be considered, some examples of which are illustrated hereinafter. FIGS. 20 to 23 are illustrative diagrams illustrating examples of the representation of the movement trajectory track. Specifically, FIG. 20 is an illustrative diagram illustrating an example of the trajectory representation based on altitude information of the movement trajectory, FIG. 21 is an illustrative diagram illustrating an example of the trajectory representation based on time information associated with the movement trajectory, FIG. 22 is an illustrative diagram illustrating an example of the trajectory representation based on whether a track is being played back, and FIG. 23 is an illustrative diagram illustrating an example of a symbol representation indicating a playback position based on movement means.

For example, in the playback of the movement trajectory track, representation of a line indicating a trajectory according to the altitude information may be changed in the movement trajectory. For example, the movement trajectory may be represented with color, a type of the line, and a thickness of the line according to a gradient being changed based on the altitude information. For example, the movement trajectory may be represented by a darker color or a thicker line as the gradient steepens. Alternatively, a movement trajectory of a part in which the gradient is steep may be represented by red or yellow and a movement trajectory of a flat part may be represented by blue or green to reflect an image of colors.

Further, as illustrated in FIG. 21, the movement trajectory may be represented by changing a type, color and thickness of the line according to a time zone. In FIG. 21, a difference in the movement trajectory is represented by the thickness of the line and the type of the line, but the present disclosure is not limited to such an example and the movement trajectory may be represented by hue and color density. Further, in FIG. 21, the movement trajectory is divided into four time zones such as dawn, morning, daytime, and evening and a difference in time zone is represented, but the present disclosure is not limited to such an example. For example, a change in a time zone may be represented by color gradation without providing a clear boundary.

Alternatively, as illustrated in FIG. 22, the movement trajectory may be represented by changing the type, the color, and the thickness of the line such that a track that is being played back and other tracks are distinguished from each other. For example, the track that is being played back may be represented by a darker line than the other tracks. Further, the track that is being played back may be represented by a thicker line than the other tracks. Further, representation of the tracks by different types of the line is considered. For example, the track that is being played back is indicated by a solid line, and other tracks are indicated by dotted lines.

Referring to FIG. 23, an example in which an icon indicating a playback position is changed according to a movement means is illustrated. The display control unit 172 may change the symbol PP indicating the playback position to an icon according to the movement means based on information of the movement means added to the movement trajectory track. In FIG. 23, an example of icons in a movement using a bicycle, walking, an airplane, and a car is illustrated.

<Provision of Analysis Information>

Figure 24:
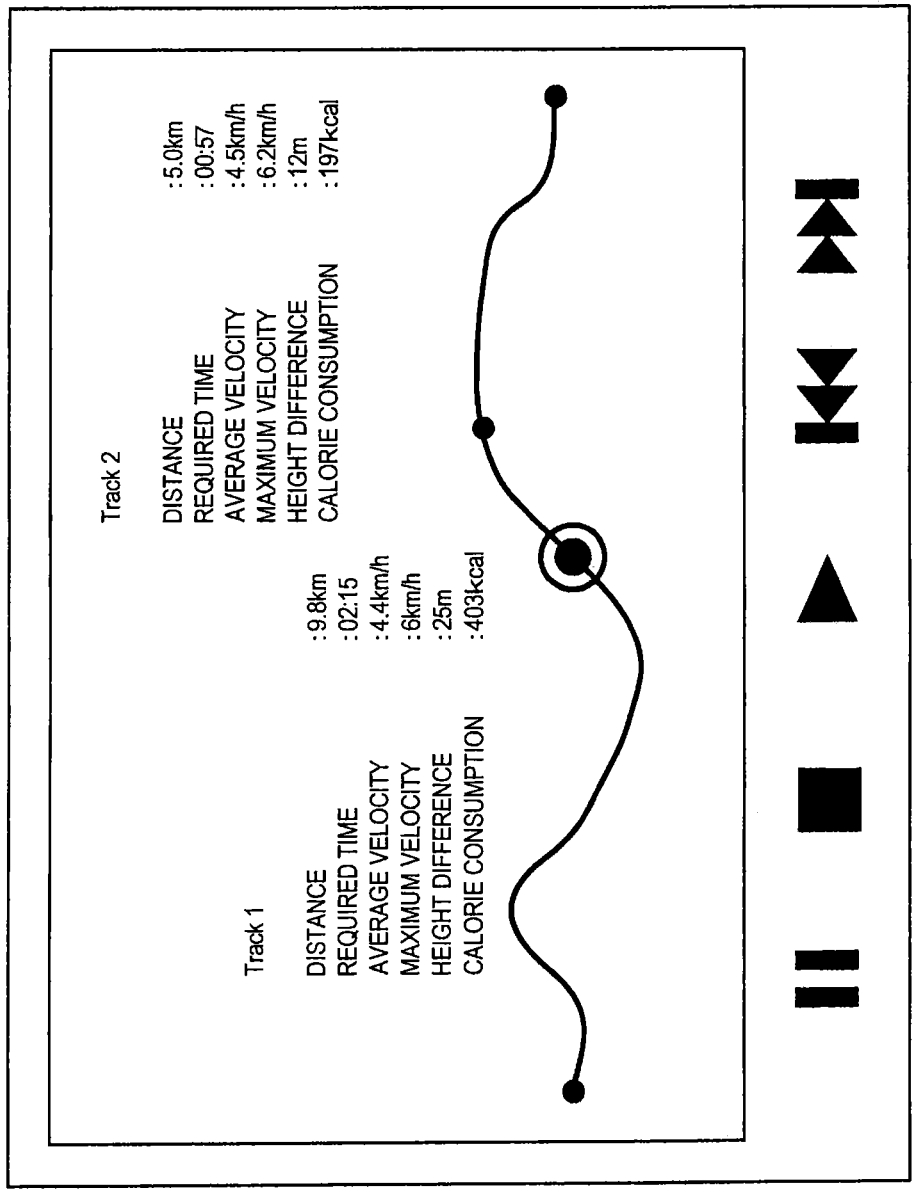
FIG. 24 is an illustrative diagram illustrating an example of a playback screen including analysis information.
Figure 25:
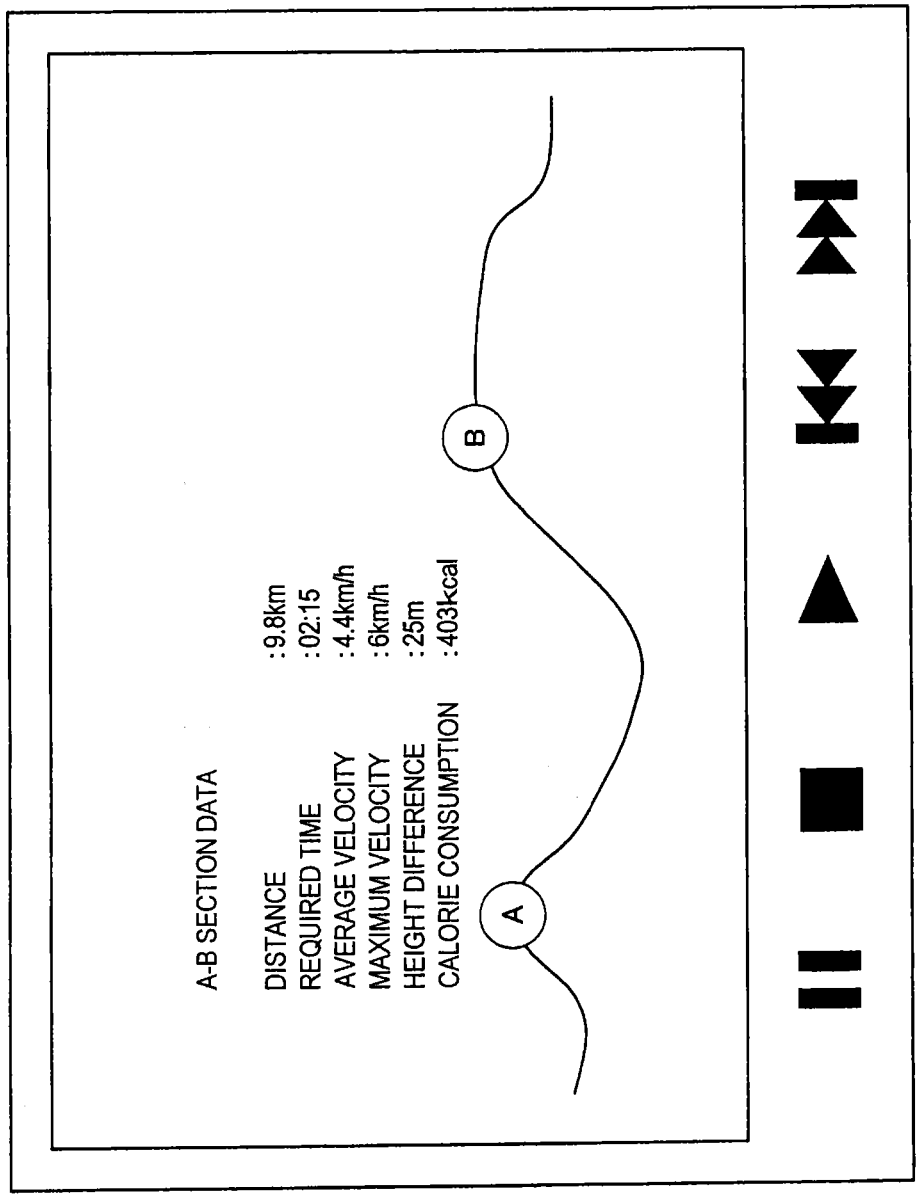
FIG. 25 is an illustrative diagram illustrating an example of a playback screen including analysis information.
Figure 26:
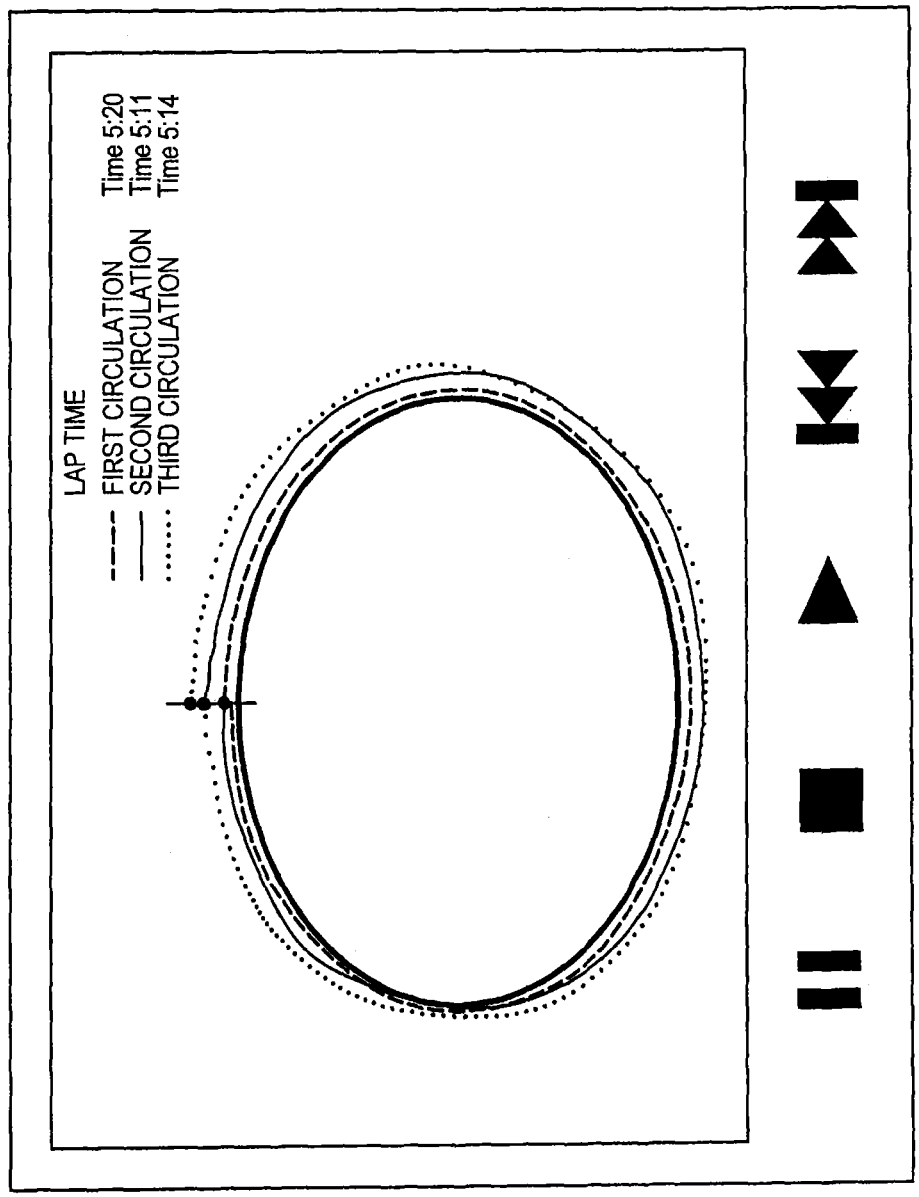
FIG. 26 is an illustrative diagram illustrating an example of a playback screen including analysis information.

Next, provision of analysis information related to the movement trajectory will be described with reference to FIGS. 24 to 26. FIGS. 24 to 26 are illustrative diagrams illustrating examples of a playback screen including the analysis information. The playback control unit 170 can provide analysis information about a track list that is being played back by causing the display control unit 172 to display the analysis information on the playback screen.

For example, the playback control unit 170 may display, on the playback screen, information about the track displayed on the playback screen. Referring to FIG. 24, a movement distance of each track, a time required for a movement, an average velocity, a maximum velocity, a height difference, and calorie consumption are displayed. Further, although not shown, analysis data for each track, as well as analysis data in the sum of all tracks included in the track list may be displayed. As such analysis data, data analyzed in advance and stored in association with data of the movement trajectory track may be displayed or data analyzed at the time of playback may be displayed.

Alternatively, the playback control unit 170 may display, on the playback screen, analysis data in a section designated in the playback screen. For example, this section is designated by frame-by-frame playback of an icon indicating a playback position and selection of a start and an end of the section. Alternatively, the section may be set based on a position designated by the manipulation unit 104 such as a touch panel.

Further, a lap time per circulation in a circulating movement may be displayed, as illustrated in FIG. 26. In this case, the analysis may start as a measurement start position as explicitly shown or the analysis may be performed by automatically detecting a circulating movement from the movement trajectory information.

3. Second Embodiment

Playback Device

Figure 27:
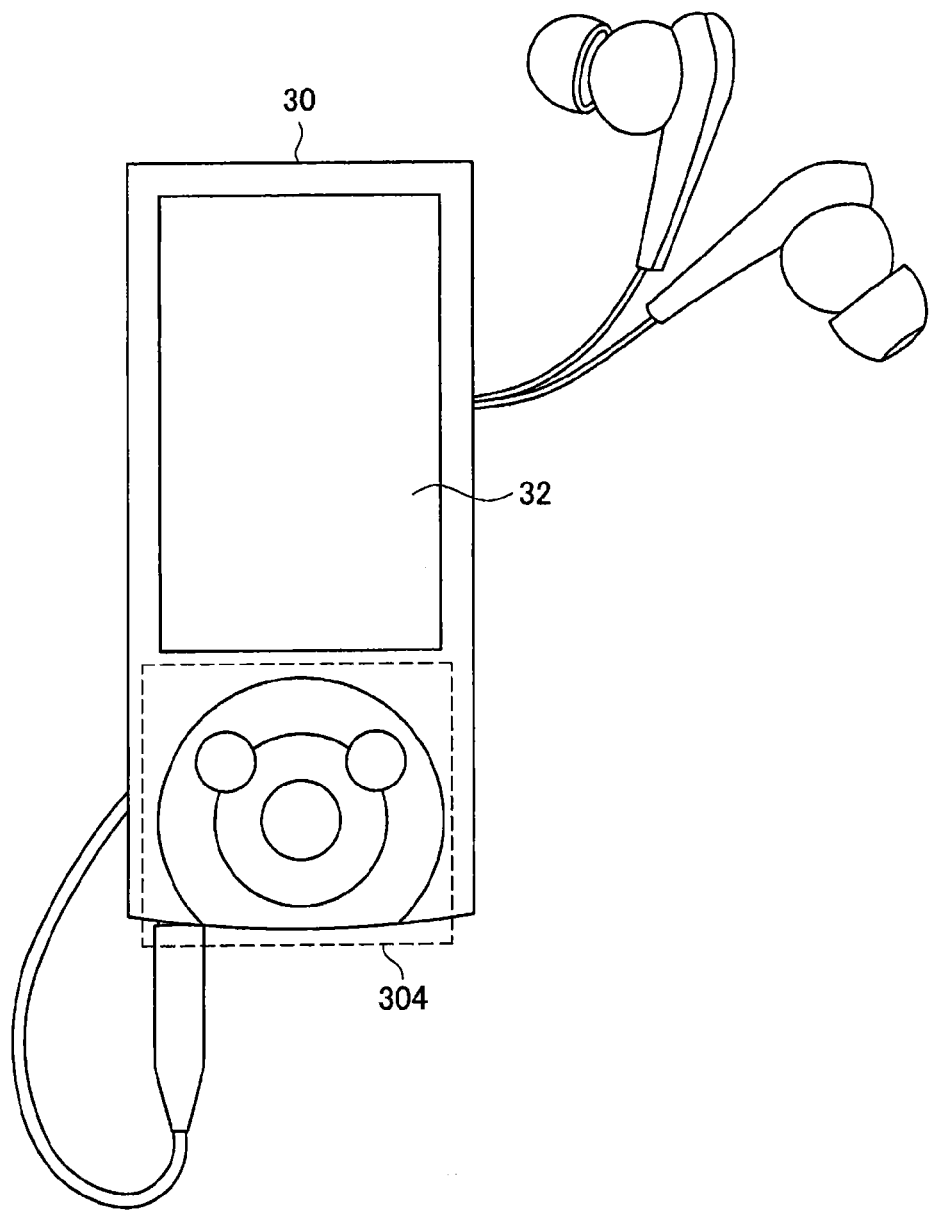
FIG. 27 is an illustrative diagram illustrating an example of an appearance of a playback device.
Figure 28:
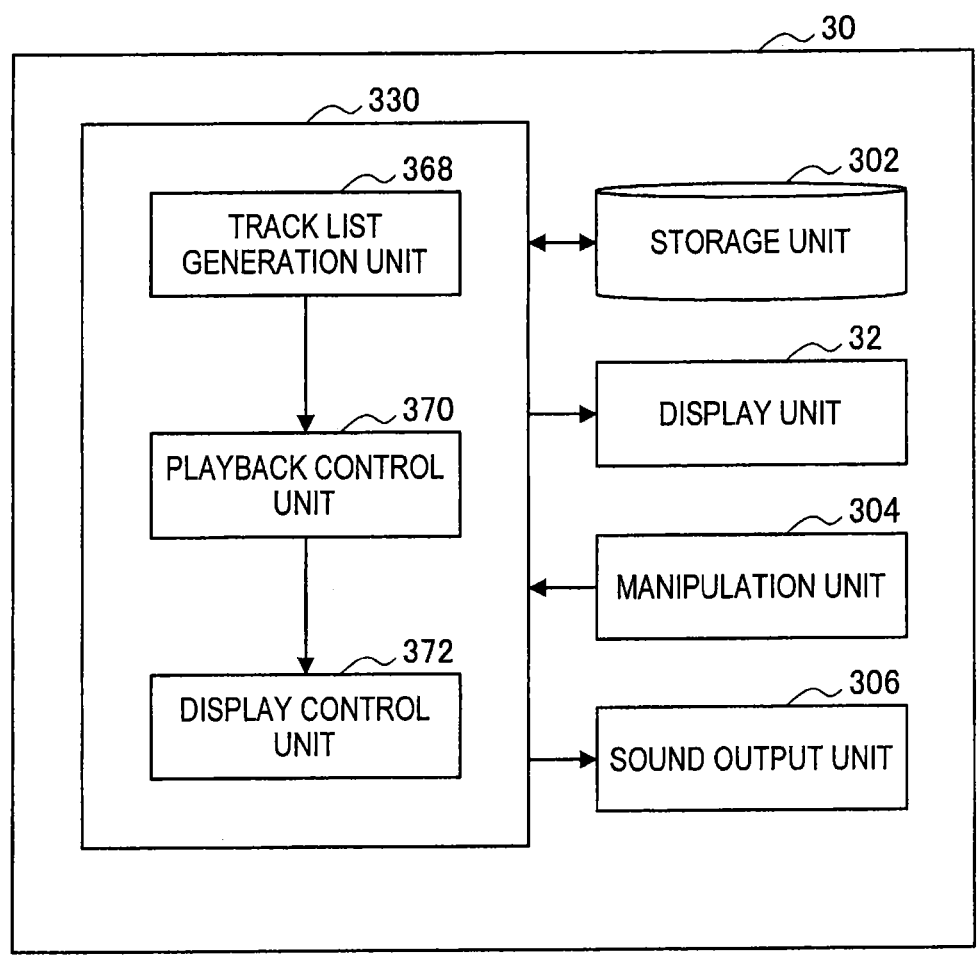
FIG. 28 is a block diagram illustrating a functional configuration of an information processing apparatus (a playback device) according to a second embodiment.

Next, a playback device 30 according to a second embodiment of the present disclosure will be described with reference to FIGS. 27 and 28. The playback device 30 is a portable playback device and has, for example, an appearance as shown in FIG. 27. FIG. 27 is an illustrative diagram illustrating an example of an appearance of the playback device. FIG. 28 is a functional block diagram of the playback device according to the second embodiment of the present disclosure.

The playback device 30 is an information processing apparatus having a music playback function and a movement history track playback function. Referring to FIG. 28, the playback device 30 mainly includes a storage unit 302, a display unit 32, a manipulation unit 304, a sound output unit 306, and a control unit 330. The control unit 330 mainly functions as a track list generation unit 368, a playback control unit 370, and a display control unit 372.

The playback device 30 differs from the PND 10 according to the first embodiment in that the playback device 30 has a movement history acquisition function and a movement history track generation function. In this case, the playback device 30 may acquire a movement trajectory track or a content track from an information processing apparatus having a movement trajectory acquisition function and a movement trajectory track generation function, and play back the track. In this case, the playback device 30 may acquire the track, for example, via a network such as the Internet, or may acquire the track via an external recording medium inserted into an interface that is not shown. Further, the movement history acquisition device and the movement trajectory track generation device may be separate devices.

Since the storage unit 302, the display unit 32, the manipulation unit 304, and the sound output unit 306 have the same functions as the storage unit 102, the display unit 12, the manipulation unit 104, and the sound output unit 106, respectively, a detailed description thereof is omitted herein. Further, the track list generation unit 368, the playback control unit 370, and the display control unit 372 have the same functions as the track list generation unit 168, the playback control unit 170, and the display control unit 172, respectively. The user using the manipulation unit 304 may perform a manipulation relating to playback of the track list through the same manipulation as a manipulation at the time of playback of music.

Thus, the movement history acquisition device, the movement trajectory track generation device, and the playback device may be realized as separate devices. The playback device has been described herein as a portable playback device, but is not limited thereto. For example, when the playback device does not have a function of acquiring the movement history, the playback device need not be a portable device. A function of playing back a movement history track may be realized by a desktop PC, a fixed audio player, or the like.

4. Third Embodiment

Imaging Device

Next, an imaging device 50 that is an information processing apparatus according to a third embodiment of the present disclosure will be described with reference to FIG. 29. FIG. 29 is a functional block diagram of the imaging device that is an information processing apparatus according to the third embodiment.

The imaging device 50 is an information processing apparatus having a movement history information acquisition function and a playback function of playing back a movement trajectory track, in addition to an imaging function. Referring to FIG. 29, the imaging device 50 mainly includes a GPS antenna 512, an imaging unit 580, a control unit 530, a communication unit 592, a storage unit 502, a display unit 52, a manipulation unit 504, and a sound output unit 506.

The control unit 530 mainly functions as a GPS processing unit 532, an imaging signal processing unit 582, a track acquisition unit 590, a track list generation unit 568, a playback control unit 570, and a display control unit 572.

Among these, since respective functions of the storage unit 502, the display unit 52, the manipulation unit 504, the sound output unit 506, the GPS antenna 512, and the GPS processing unit 532 are the same as the functions of the storage unit 102, the display unit 12, the manipulation unit 104, the sound output unit 106, the GPS antenna 112, and the GPS processing unit 132 in the first embodiment, a description thereof is omitted herein.

The communication unit 592 is a communication interface that enables the imaging device 50 to communicate with an external device. The communication unit 592 has a function of communicating with an external server under control of the control unit 530.

The imaging device 50 has an imaging function using the functions of the imaging unit 580 and the imaging signal processing unit 582. The imaging unit 580 includes an optical system, an imaging element, and a processing circuit. This optical system includes a lens element that focuses light from a subject. Also, the light incident via the optical system is supplied to the imaging element. The imaging element converts the light supplied via the optical system into an imaging signal and inputs the imaging signal to the processing circuit. Further, the imaging element may be, for example, a CCD (Charge Coupled Device) sensor or a CMOS (Complementary Metal Oxide Semiconductor) sensor. Further, the processing circuit performs various signal processing on the analog imaging signal supplied from the imaging element. For example, the processing circuit performs a sampling process, a noise removal process, a gain adjustment process, and an A/D conversion process and supplies a digital imaging signal to the imaging signal processing unit 582.

The imaging signal processing unit 582 has a function of performing various processes on the digital imaging signal supplied from the imaging unit 580. For example, the imaging signal processing unit 582 performs an imaging signal compression process and stores digital image data in the storage unit 502.

Through the configuration shown above, the imaging device 50 has an imaging function of acquiring an image, and a function of acquiring movement trajectory information by acquiring position information. The track acquisition unit 590 has a function of transmitting the acquired movement trajectory information, an image and the like to a server on a cloud via the communication unit 592 and acquiring the track. In the server on the cloud, the track generation process as described in the first embodiment is performed. The track acquisition unit 590 supplies the acquired track to the track list generation unit 568. Alternatively, a process performed by the track list generation unit 568 may also be performed by the server on the cloud.

The preferred embodiments of the present disclosure have been described above with reference to the accompanying drawings, whilst the present technology is not limited to the above examples, of course. A person skilled in the art to which the present disclosure belongs may find various alternations and modifications within the scope of the appended claims, and it should be understood that they will naturally come under the technical scope of the present disclosure.

For example, although the content has been described in the above embodiment as being the photograph or the voice memo, the present technology is not limited to such examples. For example, the content may be a concept including music data of music, a lecture, a radio program and the like, image data of a movie, a television program, a video program, a photograph, a document, a painting, a chart, and the like, a game, software, and the like.

Further, although the PND having the functions of the movement trajectory information acquisition device, the generation device that generates the information movement trajectory track from the movement trajectory, and the playback device that plays back the movement trajectory track in the first embodiment, the playback device having a function of playing back the movement trajectory track in the second embodiment, and the imaging device having the functions of the movement trajectory information acquisition device and the playback device that plays back the movement trajectory track in the third embodiment have been described, the present disclosure is not limited to such examples. The information processing apparatus may be a device having at least one of the functions of the movement trajectory information acquisition device, the generation device that generates the movement trajectory track from the movement trajectory information, and the playback device that plays back the movement trajectory track. Examples of the information processing apparatus may include an information processing apparatus such as a mobile phone, a PHS (Personal Handyphone System), a portable music player device, a portable video processing apparatus, a portable game device, a PC (Personal Computer), a home video processing apparatus (e.g., a DVD recorder or a video deck), a PDA (Personal Digital Assistants), a home game device, and a home appliance.

That is, the PND and the playback device described in the first embodiment and the second embodiment may have the imaging function. Further, the PND and the imaging device described in the first embodiment and the third embodiment have a position information acquisition function based on the GPS, but the present disclosure is not limited thereto. All position information acquisition functions such as a function of acquiring a relative position using a sensor or a function of acquiring a position using wireless communication may be used. Further, the function of acquiring position information is not limited to any one function. The device may be a device that has two or more position information acquisition functions and generates more accurate position information from information obtained by the functions. Further, the PND and the playback device described in the first embodiment and the second embodiment may have a communication function.

In this disclosure, the steps described in the flowcharts include processes executed in time series according to the described order, as well as processes not necessarily executed in time series, but executed in parallel or individually. Further, it is understood that, even in the steps processed in time series, the order may be appropriately changed in some cases.

REFERENCE SIGNS LIST

10 PND (information processing apparatus)
12 display unit
102 storage unit
104 manipulation unit
106 sound output unit
110 navigation function unit
112 GPS antenna
114 Z-axis gyro sensor
116 Y-axis gyro sensor
118 triaxial acceleration sensor
120 geomagnetic sensor
122 atmospheric pressure sensor
130 control unit
132 GPS processing unit
134 angle calculation unit
136 position calculation unit
138 velocity calculation unit
140 attitude angle detection unit
142 orientation calculation unit
144 altitude calculation unit
150 navigation unit
162 movement trajectory information acquisition unit
164 division point determination unit
166 track generation unit
168 track list generation unit
170 playback control unit
172 display control unit

The invention claimed is:

1. An information processing apparatus comprising:
   circuitry configured to
      generate a track list that is a list of track groups each including a movement trajectory track generated from movement trajectory information containing position information and time information corresponding to the position information, and
   control a display device to display a list screen including the track list,
   wherein the circuitry is further configured to control the display device to display a list screen in which the movement trajectory track is represented by a bar having a length according to a movement time, and
   wherein the circuitry is further configured to determine each track group by dividing the movement trajectory information based on one of a distance range from a predetermined position and looping information regarding return to a starting place.

2. The information processing apparatus according to claim 1, wherein the circuitry is further configured to control display of a process-type list screen in which the track groups are arranged in time series based on the time information.

3. The information processing apparatus according to claim 2, wherein the process-type list screen includes information of a start time of each track.

4. The information processing apparatus according to claim 3,
wherein the movement trajectory information is movement history information that is a history of position information,
wherein the track group includes a missing track indicating a missing part in acquisition of the position information, and
wherein the circuitry is further configured to control display of a process-type list screen shown in a format for distinguishing the missing track from other tracks.

5. The information processing apparatus according to claim 3, wherein the circuitry is further configured to control display of a normal list screen in which attribute data of the track group is shown in a table format.

6. The information processing apparatus according to claim 5, wherein the circuitry is further configured to perform switching between the normal list screen and the process-type list screen in accordance with switching instruction information for the list screen.

7. The information processing apparatus according to claim 6, wherein the circuitry is further configured to control display of a playback screen for a track selected among the tracks displayed in the list screen.

8. The information processing apparatus according to claim 5, wherein the circuitry is further configured to control display of the normal list screen, in which the track groups are sorted based on attribute data of the track groups.

9. An information processing method comprising:
generating a track list that is a list of track groups each including a movement trajectory track generated from movement trajectory information containing position information and time information corresponding to the position information; and
controlling a display device to display a list screen in which the movement trajectory track is represented by a bar having a length according to a movement time,
wherein the method further includes determining each track group by dividing the movement trajectory information based on one of a distance range from a predetermined position and looping information regarding return to a starting place.

10. A non-transitory computer-readable recording medium having a program recorded thereon, the program causing a computer to execute an information processing method, the information processing method comprising:
generating a track list that is a list of track groups each including a movement trajectory track generated from movement trajectory information containing position information and time information corresponding to the position information; and
controlling a display device to display a list screen in which the movement trajectory track is represented by a bar having a length according to a movement time,
wherein the method further includes determining each track group by dividing the movement trajectory information based on one of a distance range from a predetermined position and looping information regarding return to a starting place.

11. The information processing apparatus according to claim 1, wherein the circuitry is further configured to determine each track group by dividing the movement trajectory information based on the distance range from the predetermined position, and
wherein the dividing based on the distance range from the predetermined position includes detecting whether one or more pieces of position information of the movement trajectory information continuously is included in the distance range defined by a radius R from the predetermined position.

12. The information processing apparatus according to claim 1, wherein the circuitry is further configured to determine each track group by dividing the movement trajectory information based on altitude information,
wherein the dividing the movement trajectory information based on the altitude information is based on peak information in the dividing.

13. The information processing apparatus according to claim 1, wherein the circuitry is further configured to determine each track group by dividing the movement trajectory information based on looping information regarding return to the starting place,
wherein the dividing the movement trajectory information based on looping information regarding return to the starting place considers how soon the position returns to the starting point.

14. The information processing apparatus according to claim 1, wherein the circuitry is further configured to determine each track group by dividing the movement trajectory information based on type of transportation,
wherein the dividing the movement trajectory information based on type of transportation is performed such that different types of transportation are grouped together.

15. The information processing apparatus according to claim 14, wherein the different types of transportation are one of via automobile, via train, via bicycle, via airplane and walking.

16. The information processing apparatus according to claim 1, wherein the circuitry is further configured to determine each track group by dividing the movement trajectory information based on the altitude information.

* * * * *